US008819784B2

(12) United States Patent
Monjas Llorente et al.

(10) Patent No.: US 8,819,784 B2
(45) Date of Patent: *Aug. 26, 2014

(54) METHOD FOR MANAGING ACCESS TO PROTECTED RESOURCES AND DELEGATING AUTHORITY IN A COMPUTER NETWORK

(75) Inventors: Miguel Angel Monjas Llorente, Madrid (ES); José María Del Álamo Ramiro, Alcorcon (ES); Juan Carlos Yelmo García, Móstoles (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/579,643

(22) PCT Filed: Feb. 24, 2010

(86) PCT No.: PCT/EP2010/052319
§ 371 (c)(1),
(2), (4) Date: Aug. 17, 2012

(87) PCT Pub. No.: WO2011/103916
PCT Pub. Date: Sep. 1, 2011

(65) Prior Publication Data
US 2012/0317624 A1   Dec. 13, 2012

(51) Int. Cl.
*G06F 21/00* (2013.01)
(52) U.S. Cl.
USPC .................................................. 726/4; 726/3
(58) Field of Classification Search
USPC .......................................................... 726/4, 3
See application file for complete search history.

(56) References Cited

U.S. PATENT DOCUMENTS

| 7,334,254 B1 * | 2/2008 | Boydstun et al. ................. 726/2 |
| 2002/0046352 A1 | 4/2002 | Ludwig |
| 2008/0066159 A1 | 3/2008 | Dillaway et al. |

OTHER PUBLICATIONS

Atwood et al., OAuth 1.0 Revision A, Jun. 24, 2009, Google and Yahoo, pp. 1-13.*
Vracken et al., Using OAuth for Recursive Delegation, OAuth WG, pp. 1-11.*
International Search Report for PCT/EP2010/052319, mailed Feb. 3, 2011.

(Continued)

*Primary Examiner* — Brandon Hoffman
*Assistant Examiner* — Samuel Ambaye
(74) *Attorney, Agent, or Firm* — Nixon & Vanderhye, P.C.

(57) ABSTRACT

In a method, a consumer (100), being a software application or web site accessing a service provider (200) on behalf of a user, transmits (s10) to a service provider (200), being a software application or web site providing access to protected resources, a request for authorization to access by the consumer (100) on behalf of a delegatee (410) the protected resources of a delegator (420). The service provider (200) transmits (s20) to a controller (300) the request for authorization. A request token is also transmitted, which is a value used by the service provider (200) to register a requested authorization. The controller (300) determines (s30) whether the requested authorization meets policy settings governing the access to the delegator's protected resources. If so, the service provider (200) grants the authorization registered by the request token, and a third message including the request token is transmitted (s50) to the consumer (100).

15 Claims, 16 Drawing Sheets

(56) References Cited

OTHER PUBLICATIONS

International Preliminary Report on Patentability for PCT/EP2010/052319, mailed Feb. 16, 2012.
Vracken Z Zaltsan Alcatel-Lucent B: "Using OAuth for Recursive Delegation; draft-vrancken-oauth-redelegation-00.txt", *OAuth WG—Internet Draft*, Sep. 1, 2009, 12 pages.
Hammer-Lahav E et al., "The OAuth Protocol: Web Delegation; draft-ietf-oauth-delegation-01.t", *Network Working Group—Internet Draft*, vol. oauth, No. 1, Jul. 6, 2009, 19 pages.
Eran Hammer-Lahav, "Explaining OAuth", Sep. 5, 2007, http://hueniverse.com/2007/09/explaining-oauth/.
Atwood, M. et al, "OAuth Core 1.0 Revision A", Jun. 24, 2009, http://oauth.net/core/1.0a.
Eran Hammer-Lahav, "Beginner's Guide to OAuth—Part II: Protocol Workflow", Oct. 15, 2007, http://hueniverse.com/2007/10/beginners-guide-to-oauth-part-ii-protocol-workflow/.
"Accounts API, AuthSub for Web Applications", retrieved on Feb. 17, 2010 from http://code.google.com/apis/accounts/docs/AuthSub.html.
"Accounts API, ClientLogin for Installed Applications", retrieved on Feb. 17, 2010 from http://code.google.com/apis/accounts/docs/AuthForInstalledApps.html.

* cited by examiner

METHOD FOR MANAGING ACCESS TO PROTECTED RESOURCES AND DELEGATING AUTHORITY IN A COMPUTER NETWORK

This application is the U.S. national phase of International Application No. PCT/EP2010/052319 filed 24 Feb. 2010 which designated the U.S., the entire contents of which is hereby incorporated by reference.

TECHNICAL FIELD

The present invention relates to the management of access to protected resources, the delegation of authority for accessing such resources, and the use of such resources in a computer or communications network. In particular, the invention relates to methods carried out by physical entities for performing such access management and delegation of authority, and to physical entities and computer programs configured therefor. The invention may notably be applied in the context of web services using resources associated with users in a computer network, wherein the resources are scattered on two or more web applications or web sites and wherein the users may be geographically scattered as well.

BACKGROUND

In computer or communications networks, different web sites or web applications may provide different services for the benefit of a user, or more generally for the benefit of users. For instance, one web site or web application may manage an email account of a user. Another web site or web application may enable the storage of photos for sharing them to members of a social network of the user. Yet another web site or web application may act as a bookshop managing a user's bookshop account. Yet a further web site or web application may offer to print images and photos and deliver them to users. The possibilities are endless.

Yet, web sites and web applications may want to offer new services "which tie together functionality from other sites" (Eran Hammer-Lahav, "Explaining OAuth", Sep. 5, 2007, http://hueniverse.com/2007/09/explaining-oauth/—retrieved on Sep. 15, 2009, here referred to as ref. [1]). For instance, a digital photo lab printing web application (such as an exemplary web site "printer.consumer.com") may want to retrieve, on behalf of a user, photos stored in a digital image hosting web site (such as an exemplary site "photos.container.com") with which the user has an account, in order to print and deliver these photos to the user.

In order to implement a web service integrating protected resources from different web sites and web applications, a first web site or web application, here referred to as the "consumer", may request the user to provide his or her credentials to access a second web site or web application, here referred to as the "service provider" (although the consumer also provides services). In the above-mentioned example, the consumer would be the digital photo lab printing web application, the service provider would be the digital image hosting web site, and the protected resources would be the user's private photos. In other words, the consumer may request the user to provide his or her username and password to access the service provider. This, however, exposes the user's password and enables the password to be used by someone else for any actions associated with the user's account within the service provider (such as "even change your password and lock you out", ref. [1], section "What is it For").

To solve that problem, the OAuth protocol has been developed (Atwood, M. et al, "OAuth Core 1.0 Revision A", Jun. 24, 2009, http://oauth.net/core/1.0a—retrieved on Sep. 15, 2009, here referred to as ref. [2]). The OAuth protocol enables a web site or web application, i.e. the consumer, to access protected resources from another web site or web application, i.e. the service provider, without requiring the users to disclose their service provider credentials to the consumers (ref. [2], Abstract). The OAuth protocol may be viewed as an application programming interface (API) access delegation protocol. The valet key analogy, explained in ref. [1], section "What is it For", may help to intuitively understand the purpose of the OAuth protocol.

In the OAuth protocol, the authentication, i.e. "the process in which users grant access to their protected resources without sharing their credentials with the consumer" (ref. [2], "6. Authenticating with OAuth"), works as follows.

The consumer obtains an unauthorized request token from the service provider. The consumer directs the user to the service provider via the user's web browser, using the service provider's user authorization URL ("URL" stands here for "Uniform Resource Locator"). The user then authenticates him- or herself with the service provider. In other words, the user signs into the service provider's web site. At no time the user provides his or her service provider credentials to the consumer.

The service provider then asks the user whether he or she agrees with the consumer being granted access to the protected resources. To do so, the service provider presents, to the user, information about the protected resources to which the consumer wants to access. The information includes the duration of requested access and the type of access (e.g. copy, modify, or delete a protected resource). The information may for instance be presented on a web page of the service provider web site with an exemplary message such as "The web site <consumer-name> is requesting access to your private photos for the next 1 hour. Do you approve such access?" The user then grants or denies permission for the service provider to give to the consumer the envisaged access on behalf of the user.

If the user agrees, the request token is authorized and the user is directed back to the consumer, so that the consumer is notified that the request token has been authorized. The authorized request token is then exchanged for an access token and the protected resources can be accessed by the consumer on behalf of the user. If the user denies permission, the consumer is notified that the request token has been revoked.

An example of authentication process using the OAuth protocol is presented in Eran Hammer-Lahav, "Beginner's Guide to OAuth—Part II: Protocol Workflow", Oct. 15, 2007, http://hueniverse.com/2007/10/beginners-guide-to-oauth-part-ii-protocol-workflow/—retrieved on Sep. 15, 2009.

Now, a new problem has arisen. In order to implement a web service integrating protected resources from different web sites and web applications, a first web site or web application, i.e. a "consumer", may wish, on behalf of a first user, to access the protected resources of a second user from a second web site or web application, i.e. a "service provider", wherein the first user and the second user are different users.

For instance, the second user should allow the first user using a consumer, which may be a digital photo lab printing web application, to access a service provider, which may be a digital image hosting web site, to access the protected resources associated with the second user, which may be the second user's private photos.

Patent application US 2008/0066159 A1 relates to a delegation mechanism involving an assertor, a first principal, and a second principal (paragraphs [0007], [0068]-[0078], and FIG. 6). The assertor has a right-granting ability. Via transfer of a delegation authority assertion, right-granting ability is delegated from assertor to principal #1.

It is desirable to improve the methods, physical entities and computer programs to manage access, on behalf of users, by web sites or web applications, referred to here as consumers, to protected resources associated with the users on other web sites or web applications, referred to here as service providers, with in mind the need of reducing the operational burden on the users and the desire for addressing more scenarios in a flexible, secure and efficient manner.

SUMMARY

To meet or to at least partially meet these objectives, methods, delegation assistants and computer programs are defined in the independent claims. Advantageous embodiments are defined in the dependent claims.

In one embodiment, a method is carried out at least by a consumer, a service provider and a controller. A service provider is at least one of a software application and a web site that is configured to provide access to protected resources. A consumer is at least one of a software application and a web site that is configured to access a service provider on behalf of a user. The method includes transmitting, by the consumer to the service provider, a first message representing a request for authorization to access by the consumer on behalf of a first user, here referred to as delegates, the protected resources of a second user, here referred to as delegator, from the service provider. The method further includes transmitting, by the service provider to the controller, a second message representing the request for authorization to access by the consumer on behalf of the delegatee the protected resources of the delegator from the service provider. The second message includes a request token. A request token is a value used by a service provider to register a requested authorization to access protected resources. The method further includes determining, by the controller, whether the requested authorization represented by the second message meets policy settings governing the access to protected resources of the delegator; and, if it is determined that the requested authorization meets the policy settings, granting, by the service provider, the authorization registered by the request token, and transmitting, by at least one of the controller and the service provider, to the consumer, a third message including the request token.

The controller is one or more physical entities, which may include one or more computer programs or hardware circuitry elements for executing the functions of the controller. The controller may for instance be integrated with one or more server computers or with one or more user terminals. The controller is configured to receive a message, i.e. the second message, including a request token. The second message represents the request for authorization to access by the consumer on behalf of the delegatee the protected resources of the delegator from the service provider. The controller is further configured to check (i.e., to determine) whether the second message meets the policy settings governing the access to protected resources of the delegator. In other words, the controller checks whether the requested authorization represented by the second message meets the policy settings governing the access to protected resources of the delegator.

If the controller determines that the requested authorization meets the policy settings, the service provider is given a free hand to grant the authorization associated with the request token. The service provider may then grant the authorization registered by the request token. Optionally, before granting the authorization, the service provider may perform further determinations as to whether the authorization registered by the request token is safe and/or legitimate and, if so, the service provider grants the authorization registered by the request token.

After the authorization is granted (i.e. authorized by both the service provider and the controller), a third message including the authorized request token is transmitted by the controller, the service provider or both, to the consumer. The consumer may then access, on behalf of the delegatee, the protected resources associated with the delegator from the service provider. Therefore, a service integrating protected resources of the delegator can be offered by the consumer for the benefit of the delegatee, who can obtain whatever the output of the service is. The method also benefits the delegator, who can conveniently share his or her protected resources with the delegatee or with the consumer working on behalf of the delegatee, without releasing and therefore exposing his or her credentials.

In other words, the controller acts, on the one hand, as delegation assistant for the delegator. It assists the delegator in managing the delegation of authority to authorize or prevent access to his or her protected resources. The controller also acts, on the other hand, as delegation assistant for the delegatee. It assists the delegatee to obtain authorization to access protected resources of the delegator.

Policy settings, also called policy rules or privacy settings, governing the access to protected resources of the delegator are established in advance for enforcement by the controller. The controller does not give a free hand to the service provider to allow access to protected resources if the second message does not meet the policy settings. When a second message, and the requested authorization represented by the second message, does not meet the policy settings, an access denial is enforced by the controller and the service provider without the need for the delegator to intervene at the time when the second message is received. In some embodiments, the delegator may intervene at the time when the second message is received, if the controller requests the delegator to do so, for instance when faced with a special requested authorization, i.e. a requested authorization which may not be refused or allowed based only on the existing policy settings set in the controller.

In other words, the controller is given the opportunity to intercept and evaluate each requested authorization and, depending on the type of requested authorization represented by the message and its request token (i.e. on a per request basis), the controller decides whether to accept or refuse the requested authorization. The controller makes the determination, i.e. decides, based on information extracted or gathered from the message regarding what would or could happen if the request token was authorized.

This relieves the delegator from having to interact, at the time when the message is received, with the service provider.

Thus, the method improves and facilitates, notably by reducing the operational burden on the users, privacy management in computer or communication networks. Privacy management, from a users' perspective, is the task consisting in controlling, by the users or to the benefit of the users, which protected resource stored on, provided by or accessible from a service provider and associated with the users (i.e., the delegators) can or cannot be accessed by a given consumer, on behalf of which other users (i.e., the delegatees), and how. The privacy management also includes the proper handling of the users' protected resources, consistent with the preferences of the users, for instance regarding the operations which can be performed in relation to the protected resources of users.

Besides reducing the operational burden on users, the method also reduces the risk of a human error that would involve a user (i.e., a delegator) unintentionally granting access to some protected resources.

A message is a unit or units of information capable of being transmitted over a communication channel or over a network and capable of carrying, if necessary, a request token and associated parameters, if any. The message may also be called a request or may represent a request.

A user is a human or a group of humans whose identity can be authenticated, or a physical entity, such as a user terminal or user equipment, which identity can be authenticated. In other words, when the term "user" is used here (or the terms "delegatee" or "delegator"), it may refer to either or both the actual end user(s), i.e. the human or group of humans, or the user's terminal or user's equipment to which an identity may be attached. Moreover, if a user terminal is capable of operating using several identities (e.g. associated with different user profiles), each identity under which the user terminal may operate may correspond to one user in the context of the invention.

Thus, the term "user" (or the terms "delegatee" or "delegator") also encompasses here, where appropriate, the user's equipment or user's terminal (or respectively the delegatee's equipment or delegatee's terminal, or delegator's equipment or delegator's terminal). For instance, if an interaction is required with the user, the user's equipment may well be arranged to carry out the interaction without human intervention. This is notably why the term "user" generally refers to either or both the user as a human being, or group of human beings, and the user's equipment used by a certain human being.

A protected resource is either data related to a user's identity or a group of identities associated with a group of users, or a service associated with an identity of a user or group of identities associated with a group of users. Examples of protected resources include private photos, contacts in an online address book, entries in an online calendar, lists of friends in an online social network, lists of bookmarks, lists of favourite songs stored in an online social network account, lists of goods recently purchased from an online store, the possibility to save or publish data on a server or blog, etc. A protected resource may include protected social information.

The access to or use of a protected resource may, as mentioned above, consist in the use of a service. In that context, the provision of a service is a technical and economical activity which may for instance result in the ownership of physical goods through a sale, modification of the technical characteristics of a computer configuration, etc. The service may be a web service.

The invention may be used with web-based social network services, but is not limited thereto. Likewise, the invention may use a protocol derived from or extending the OAuth protocol but is not limited thereto. The invention may be used in other contexts and with other protocols.

In one embodiment, the method further includes, before the step of transmitting, by the consumer to the service provider, the first message, transmitting, by at least one of a software application and a physical device controlled by the delegatee, to the consumer, a request for a service involving access by the consumer on behalf of the delegatee to the protected resources of the delegator from the service provider.

In one embodiment, the method is such that the step of transmitting, by the consumer to the service provider, the first message includes transmitting the first message by the consumer to the service provider through at least one of a software application and a physical device controlled by the delegatee.

In one embodiment, the method further includes, between the step of determining, by the controller, whether the requested authorization represented by the second message meets policy settings governing the access to protected resources of the delegator, and the step of granting, by the service provider, the authorization registered by the request token, and, if it is determined that the requested authorization meets the policy settings, transmitting, from the controller to the service provider, a message indicating that the requested authorization represented by the second message can be accepted. The message gives free hand to the service provider to grant, i.e. to authorize, the requested authorization.

In one embodiment, the method further includes, between the step of granting, by the service provider, the authorization registered by the request token, and the step of transmitting, by at least one of the controller and the service provider, to the consumer, the third message including the request token; transmitting, from the service provider to the controller, a message including the request token for which the authorization has been granted.

In one embodiment, the method is such that the step of transmitting, to the consumer, the third message including the request token is performed from the controller.

In one embodiment, the method is such that the controller includes a delegation assistant being executed on behalf of the delegatee, and a delegation assistant being executed on behalf the delegator, wherein a delegation assistant is at least one of a software application and a physical device.

In one embodiment, the method is such that determining, by the controller, whether the requested authorization represented by the second message meets policy settings governing the access to protected resources of the delegator includes extracting, from the second message, at least one of (i) information about the consumer from which the requested authorization originates, (ii) information about the delegatee on behalf of which the consumer requests authorization to access the protected resources of the delegator, (iii) information about the protected resources on which one or more operations are requested to be authorized by means of the request token, and (iv) information about the one or more operations which are requested to be authorized by means of the request token; and determining whether the extracted information meets the policy settings. Extracting the information from the message may include parsing the message.

This embodiment enables effective control, by the controller (acting for the delegator), of the significance of a request token included in a second message in terms of privacy management, to the extent that this can be deduced from the second message including the request token. If the information extracted from the message does not meet the policy settings set in advance for or by the delegator, the service provider is not given free hand to grant the requested authorization.

The examination, by the controller, of the second message may relate to features or identity of the consumer from which the request token originates, wherein some consumers or types or groups of consumers may be considered unreliable. The examination, by the controller, of the second message may also relate to features or identity of the delegatee on behalf of which the requested authorization represented by the second message has been created, wherein some delegatees or types or groups of delegatees may be considered unreliable.

Provided that information about the protected resource(s) on which one or more operations are requested to be authorized by means of the second message can be obtained or extracted from the second message (either because the message includes a parameter identifying such protected resources or because it is possible from one or more characteristics of the message to derive an identification of the protected resources or type of protected resources associated with the requested authorization), the examination of the second message by the controller may include extracting such information about the protected resource(s). For instance, if the second message corresponds to a requested authorization in relation to a particular protected resource or type of protected resources, such as sensitive information (e.g., bank details), the service provider may be prevented from granting the authorization registered by the request token.

In one embodiment, information about the protected resource(s) on which one or more operations are requested to be authorized by means of the request token can be obtained or extracted from the second message.

Provided that information about the one or more operations which are requested to be authorized by means of the request token can be obtained or extracted from the second message, the step of checking the second message may include determining whether such characteristics of the operations requested to be authorized meet the policy settings.

In one embodiment, information about operations which are requested to be authorized by means of the request token can be obtained or extracted from the second message.

The invention also relates to a delegation assistant including a receiver, a determiner, and a transmitter. The receiver is configured for receiving, from another delegation assistant, a message, here referred to as request message, representing a request for authorization to access by a consumer on behalf of a first user, here referred to as delegatee, the protected resources of a second user, here referred to as delegator, from the service provider. The request message includes a request token. In that context, a service provider is at least one of a software application and a web site that is configured to provide access to protected resources. A consumer is at least one of a software application and a web site that is configured to access a service provider on behalf of a user. A request token is a value used by a service provider to register a requested authorization to access protected resources. The determiner is configured for determining whether the requested authorization represented by the request message meets policy settings governing the access to protected resources of the delegator. The transmitter is configured for, if it is determined that the requested authorization meets the policy settings, transmitting, to the service provider, a response message indicating that the requested authorization represented by the request message can be granted. In other words, the transmitter is configured for, if it is determined that the requested authorization meets the policy settings, giving a free hand to the service provider to grant the requested authorization.

In one embodiment, the delegation assistant is such that the determiner includes an extracter and a sub-determiner. The extracter is configured for extracting from the request message at least one of (i) information about the consumer from which the requested authorization originates; (ii) information about the delegatee on behalf of which the consumer requests authorization to access the protected resources of the delegator; (iii) information about the protected resources on which one or more operations are requested to be authorized by means of the request token; and (iv) information about the one or more operations which are requested to be authorized by means of the request token. The sub-determiner is configured for determining whether the extracted information meets the policy settings.

The invention also relates to a computer program including instructions configured, when executed on a computer or the above-described controller, to cause the server or the computer to operate as a delegation assistant as defined above. The invention also relates to a computer program product or computer-readable medium including such a computer program.

BRIEF DESCRIPTION OF THE DRAWINGS

Embodiments of the present invention shall now be described, in conjunction with the appended figures, in which.

DESCRIPTION OF SOME EMBODIMENTS

The present invention shall now be described in conjunction with specific embodiments. These specific embodiments serve to provide the skilled person with a better understanding, but are not intended to in any way restrict the scope of the invention, which is defined by the appended claims.

Figure 1:
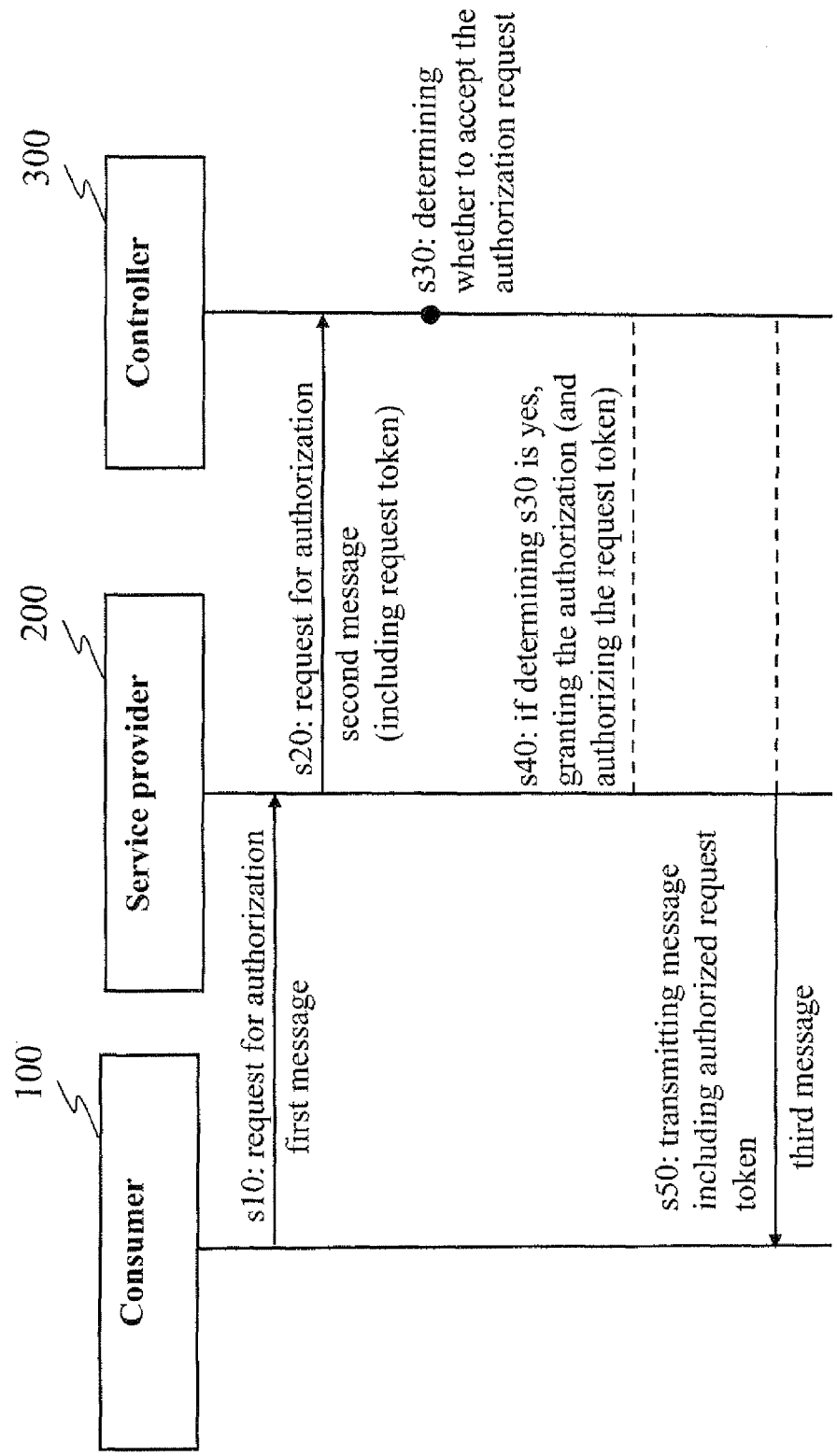
FIG. 1 is a schematic message diagram of a method in one embodiment of the invention.

FIG. 1 is a schematic message diagram of a method in one embodiment of the invention. The method illustrated in FIG. 1 is carried out by a consumer 100, a service provider 200, and a controller 300.

The consumer 100 seeks to access, on behalf of a delegatee 410 (not illustrated in FIG. 1), protected resources of a delegator 420 (not illustrated in FIG. 1) accessible from a service provider 200. To do so, the consumer 100 transmits s10 a first message to a service provider 200. The first message represents, or includes computer-readable information representing, a request for authorization to access protected resources of a delegator 420. The service provider 200 receives the first message originating from the consumer 100. Between the consumer 100 and the service provider 200, there may be intermediary physical entities through which the first message is transmitted (not illustrated in FIG. 1, but see for instance FIG. 4).

The first message represents, or includes computer-readable information representing, a request for authorization to access by the consumer 100 on behalf of the delegatee 410 the protected resources of the delegator 420 from the service provider 200. The service provider 200 detects from the first message that the request for authorization must first be approved by a controller 300 working for the delegator 420. The service provider 200 then assigns a request token to the received request for authorization. In that context, the request token is a value which identifies the request for accessing the protected resources.

The service provider 200 creates a second message including the request token, which is at that stage unauthorized, and transmits s20 the second message to the controller 300. The controller 300 is either a controller in charge of examining requests for authorization for all delegators or may be a controller associated with a particular delegator 420 or particular group of delegators 420. In the latter case, the service provider 200 is capable, from the first message, to retrieve sufficient information to locate the controller 300 in charge of evaluating the requested authorization to access protected resources of the delegator 420 to which the first message relates.

The second message may include, in addition to the request token, various additional information or parameters to accompany the request token, such as an identification of the consumer 100 from which the requested authorization registered by the request token originates, the delegatee 410 on behalf of which the requested authorization has been created, the protected resources which are the subject of the requested authorization from the consumer 100, and/or the operations that are requested to be authorized by the consumer 100 in relation to the protected resources.

The second message may be a packet, a HTTP request or any other suitable formatted signal to carry the request token. Then, the controller 300 determines s30 whether the received second message complies with policy settings governing access to protected resources of the delegator 420.

The policy settings are stored in the controller 300 or are accessible by the controller 300, and relate to the protected resources associated with the delegator 420 for whom the controller 300 works. The policy settings may be set in advance by the delegator 420. Alternatively or additionally, the privacy settings may be set by default when starting the controller 300 working for a delegator 420. Updating the privacy settings may be carried out by the delegator 420, by a third party authorized to configure the controller 300, or by both.

For instance, a delegator 420 (i.e. a user acting as delegator 420 or, in other words, having the role of a delegator 420) may set in advance the policy settings to be used by the controller 300 to indicate that first particular consumers 100, e.g. "doesntcareaboutprivacy.com" and "sellsyourprivatedatato3rdparties.com", are not authorized to access any of the delegator's protected resources, whatever the resources and the operations to be performed on the resources. The delegator 420 may also indicate that requested authorizations in messages from another particular consumer 100, e.g. "caresaboutprivacy.com", should only be rejected if the protected resources are for instance bank details or social security numbers, whatever the operations to be performed on the resources, or if the operations requested to be authorized consist in the deletion of some protected resources.

The delegator 420 may also set in advance the policy settings to be used by the controller 300 to indicate that consumers 100 when working on behalf of first particular delegatees 410 are not authorized to access any of the delegator's protected resources, whatever the resources and the operations requested to be performed thereon. The delegator 420 may also indicate for instance that consumers 100 when working on behalf of other particular delegatees 410 should only be authorized to access the delegator's protected resources if the protected resources are not bank details or social security numbers or if the operations requested to be authorized do not consist in the deletion of some protected resources.

The rejection of a request for authorization by the controller 300 may involve deleting the second message, logging the particulars of the second message in the controller 300 for later assessment, and informing the consumer 100 and/or the service provider 200 about the non-authorization of the request. The information sent to the consumer 100 and/or the service provider 200 may include details about the reasons why the request has been rejected.

If the controller 300 determines s30 that the requested authorization represented by the second message meets the policy settings governing the access to the protected resources of the delegator 420, the controller 300 gives a free hand to the service provider 200 to authorize the requested authorization and the associated request token. The service provider 200 then grants s40 the authorization registered by the request token. A third message is then transmitted s50 to the consumer 100 including the authorized request token indicating to the consumer 100 that the request for authorization has been approved by both the controller 300 and the service provider 200.

Upon receipt of the authorized request token, the consumer 100 uses the request token to access, on behalf of the delegatee 410, the protected resources of the delegator 420 from the service provider 200 (not illustrated in FIG. 1).

In FIG. 1, the dotted line associated with step s40 indicates that approving and granting the requested authorization are carried out together by the service provider 200 and the controller 300. The service provider 200 grants the requested authorization only if the controller 300 has allowed the service provider 200 to do so. Furthermore, even if the controller 300 approved the requested authorization, the service provider 200 may still decide not to grant the requested authorization if the requested authorization is considered unsafe or illegitimate. If the service provider 200 decides to refuse the requested authorization, the service provider 200 may also block the first message earlier upon receiving it, so that no second message is sent to the controller 300 and the number of exchanged messages is reduced.

The dotted line associated with step s50 in FIG. 1 illustrates the fact that the step of transmitting the third message including the authorized request token to the consumer 100 may be made by the service provider 200 or by the controller 300.

The method provides end users with a user-friendly and efficient solution for managing privacy aspects of their protected resources scattered in a plurality of network entities. At the same time, the method minimizes implementation impacts. Users acting as delegators 420 need not go through every single service provider 200 that stores protected resources about them in order to set limits to the use of their protected resources they want to permit. Setting policy settings in the controller 300 is sufficient to address authorization requests from many service providers 200. Additionally, users acting as delegators 420 are less often bothered and asked to grant or deny an authorization request by a consumer 100 to access protected resources on behalf of a delegatee 410.

In one embodiment, the second message transmitted s20 by the service provider 200 includes more than one request token and represents more than one requested authorization by one or more consumers 100. The second message is checked by the controller 300 against the policy settings and the controller 300 may accept only the requested authorizations that meet the policy settings. The controller 300 may inform the service provider 200 accordingly.

Figure 2:
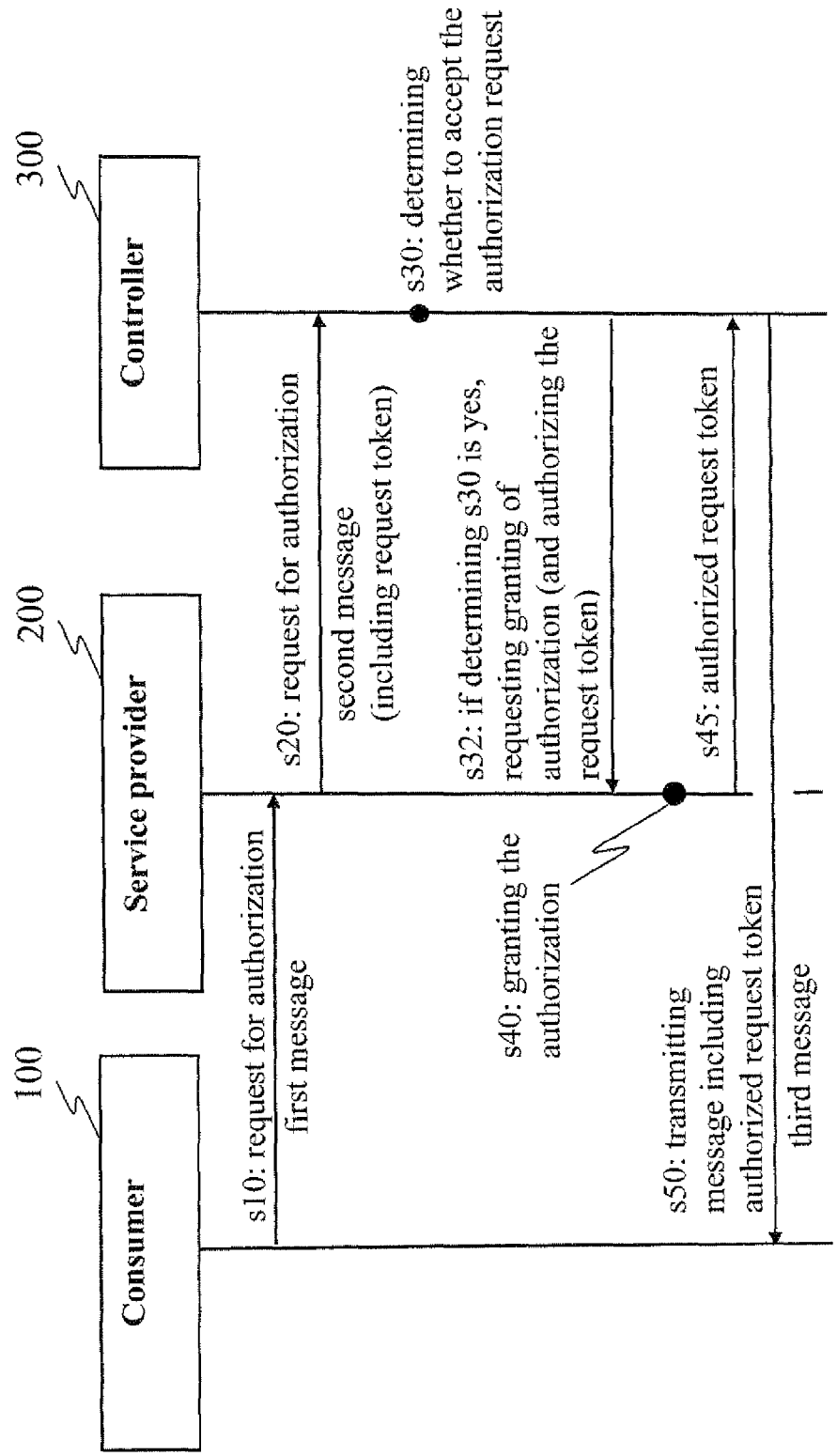
FIG. 2 is a schematic message diagram of a method in one embodiment of the invention, wherein, after the controller determines that the request for authorization can be accepted, a message is transmitted from the controller to the service provider to allow the service provider to grant the authorization and wherein the step of transmitting the third message including the authorized request token is performed from the controller.

FIG. 2 is a schematic message diagram of a method in one embodiment of the invention, which differs from the embodiment illustrated in FIG. 1 in that, in FIG. 2, the controller 300, after determining s30 whether to accept the requested authorization and if the outcome of the determining step s30 is positive, requests s32 to the service provider 200 granting of the authorization, and authorizing the requested token associated therewith, by sending s32 a message to the service provider 200. The message sent in step s32 indicates the approval of the requested authorization by the controller 300.

Thereafter, the service provider 200 grants s40 the authorization and transmits s45 the authorized request token to the controller 300. The controller 300 then transmits s50 a third message including the authorized request token to the consumer 100, which may then use the authorized request token to access the protected resources of the delegator 420 from the service provider 200.

Although not illustrated in FIG. 2, in the step of determining s30 results in the rejection of the requested authorization, the controller 300 may inform the service provider 200 that the requested authorization associated with the request token has been refused on the controller 300 side based on the policy settings set for or by the delegator 420.

Figure 3:
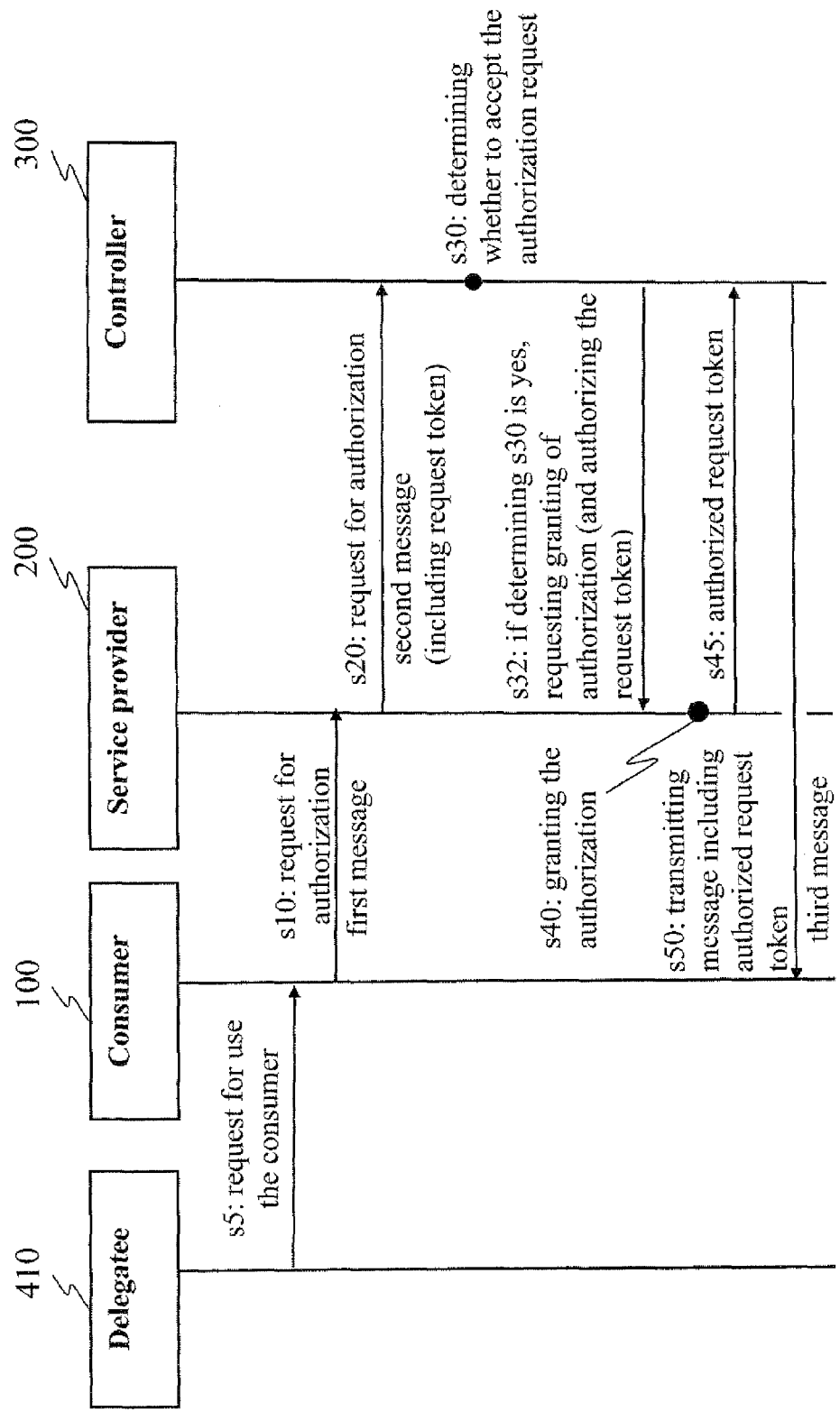
FIG. 3 is a schematic message diagram of a method in one embodiment of the invention, wherein, before the consumer transmits a first message to the service provider, the consumer receives a request for using the consumer from a delegatee.

FIG. 3 is a schematic message diagram of a method in one embodiment of the invention, which differs from the embodiment illustrated in FIG. 2 in that, in FIG. 3, before sending 810 by the consumer 100 to the service provider 200 a request for authorization in a first message, the delegatee 410 requests s5 to use a service offered by the consumer 100 wherein the service makes use of protected resources of a delegator 420 accessible from the service provider 200. In other words, the delegatee 410 invokes s5 a consumer service or application 100 that requires the access to the delegator's protected resources hosted in the service provider 200. Step s5 may involve, but is not limited to, invoking a URL from a web browser.

FIG. 3 therefore illustrates a delegatee-initiated method. In other embodiments, the consumer 100 may send a request for authorization to a service provider 200 not directly based on a request received from a delegatee 410 but rather on the consumer's 100 own initiative. For instance, the delegatee 410 may have set in the consumer 100 that a particular delegator 420 is considered to be a friend. Based on this information, the consumer 100 may send s10 a request for authorization to the service provider 200 to obtain the birthday of the delegator 420. If this request for authorization is allowed by both the service provider 200 and the controller 300, the consumer 100 may send a reminder message a few days or weeks before the birthday of the delegator 420 to the delegatee 410.

Still in the same example, the consumer 100 may also send s10, on its own initiative, a request for authorization to another service provider 200, such as an online bookstore (or a plurality of service providers 200 being a plurality of online bookstores) in order to find out which books the delegator 420 has recently purchased, or which types of books the delegator 420 is generally interested in. If this request for authorization is allowed by both the service provider 200 and the controller 300 acting for the delegator 420, the consumer 100 may, a few days or weeks before the birthday of the delegator 420, provide to the delegatee 410 information about suggested birthday presents for the delegator 420.

Figure 4:
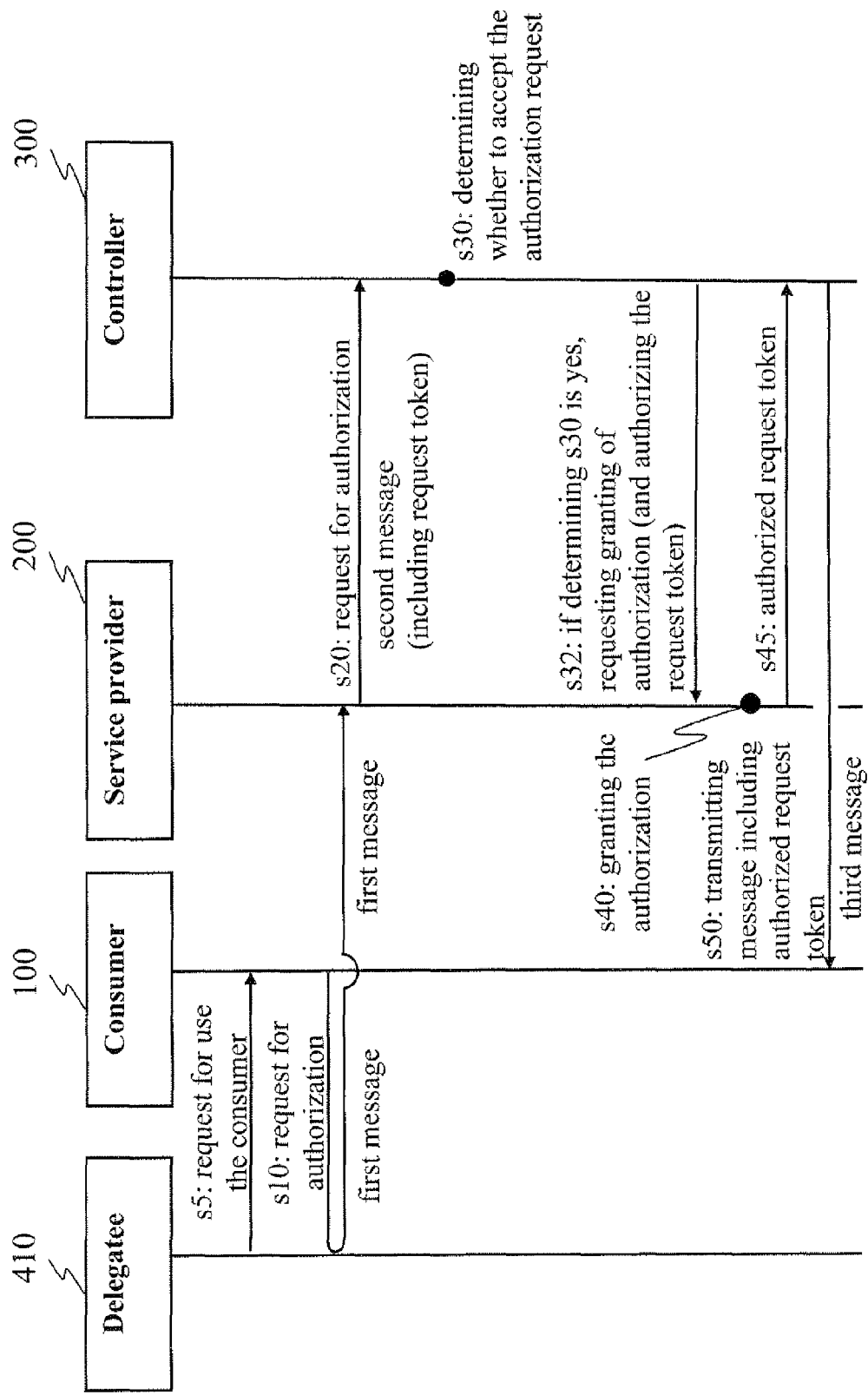
FIG. 4 is a schematic message diagram of a method in one embodiment of the invention, wherein the first message sent from the consumer to the service provider is transmitted through the delegatee.

FIG. 4 is a schematic message diagram of a method in one embodiment of the invention, which differs from the method illustrated in FIG. 3 in that, in FIG. 4, once the consumer 100 has received s5 a request by a delegatee 410 for using a service of the consumer 100, the consumer 100 sends s10 the first message to the service provider 200 (i.e. the request for authorization to use resources of a delegator 420 from the service provider 200) through the delegatee 410.

Sending s10 by the consumer 100 the first message to the service provider 200 through the delegatee 410 may include, in one embodiment, redirecting the delegatee 410 web browser to a web page of the service provider 200, for instance in accordance with the OAuth protocol (see ref. [2], "6. Authenticating with OAuth"). The redirection mechanism initiated by the consumer 100 may also include giving an opportunity to the delegatee 410 to prevent the request for authorization from being sent by the consumer 100 to the service provider 200. This allows the delegatee 410 to control communications taking place between the consumer 100 and the service provider 200.

For instance, a delegatee 410 may wish to avoid or restrict the communication by a consumer 100 with some service providers 200 on behalf of the delegatee 410.

Figure 5:
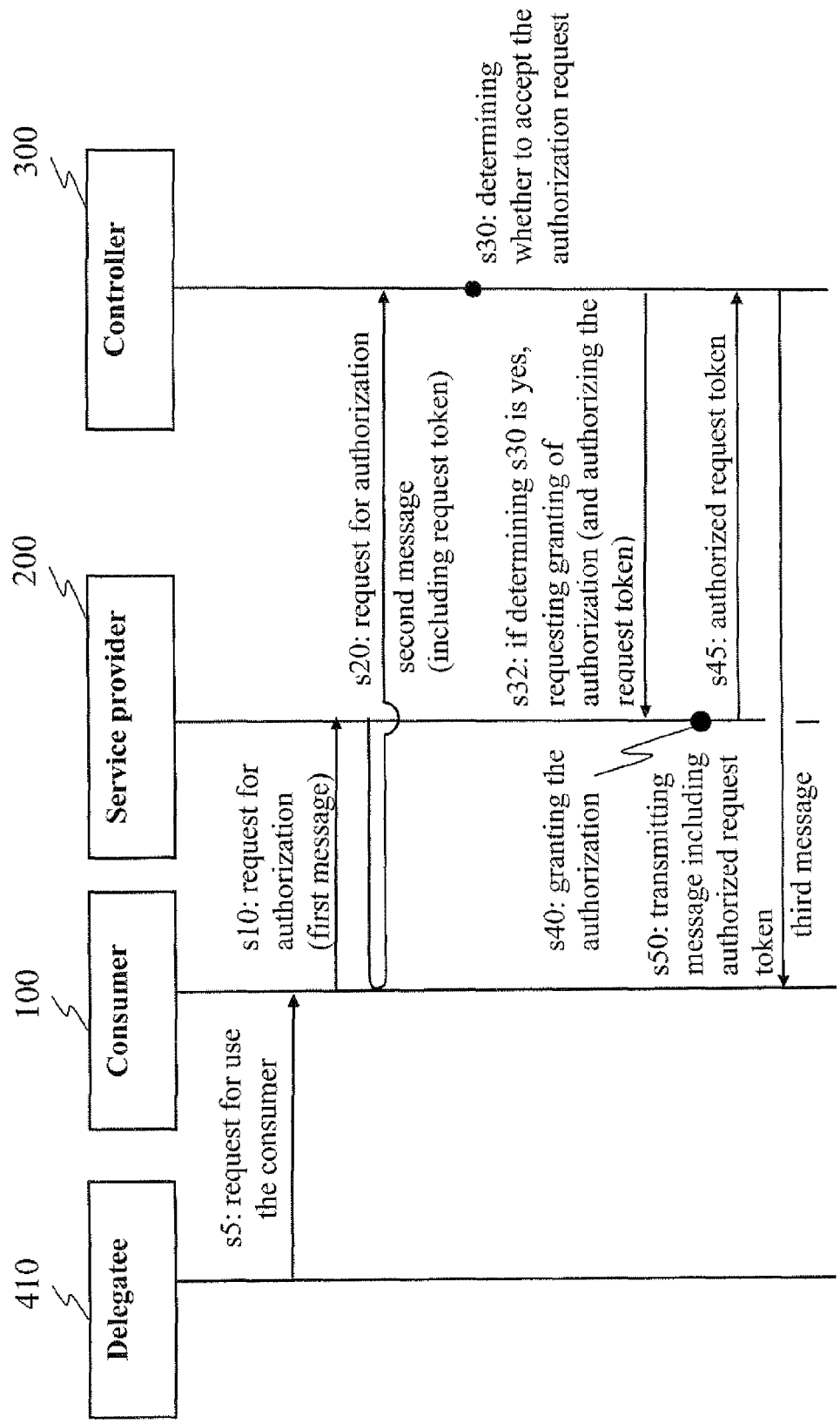
FIG. 5 is a schematic message diagram of a method in one embodiment of the invention, the second message sent by the service provider to the controller is transmitted through the consumer.

FIG. 5 is a schematic message diagram of a method in one embodiment of the invention which differs from the embodiment illustrated in FIG. 3 in that, in FIG. 5, the second message sent from the service provider 200 to the controller 300 is sent through the consumer 100. Therefore, the consumer 100 receives the unauthorized request token assigned by the service provider 200 to its request for authorization.

Figure 6:
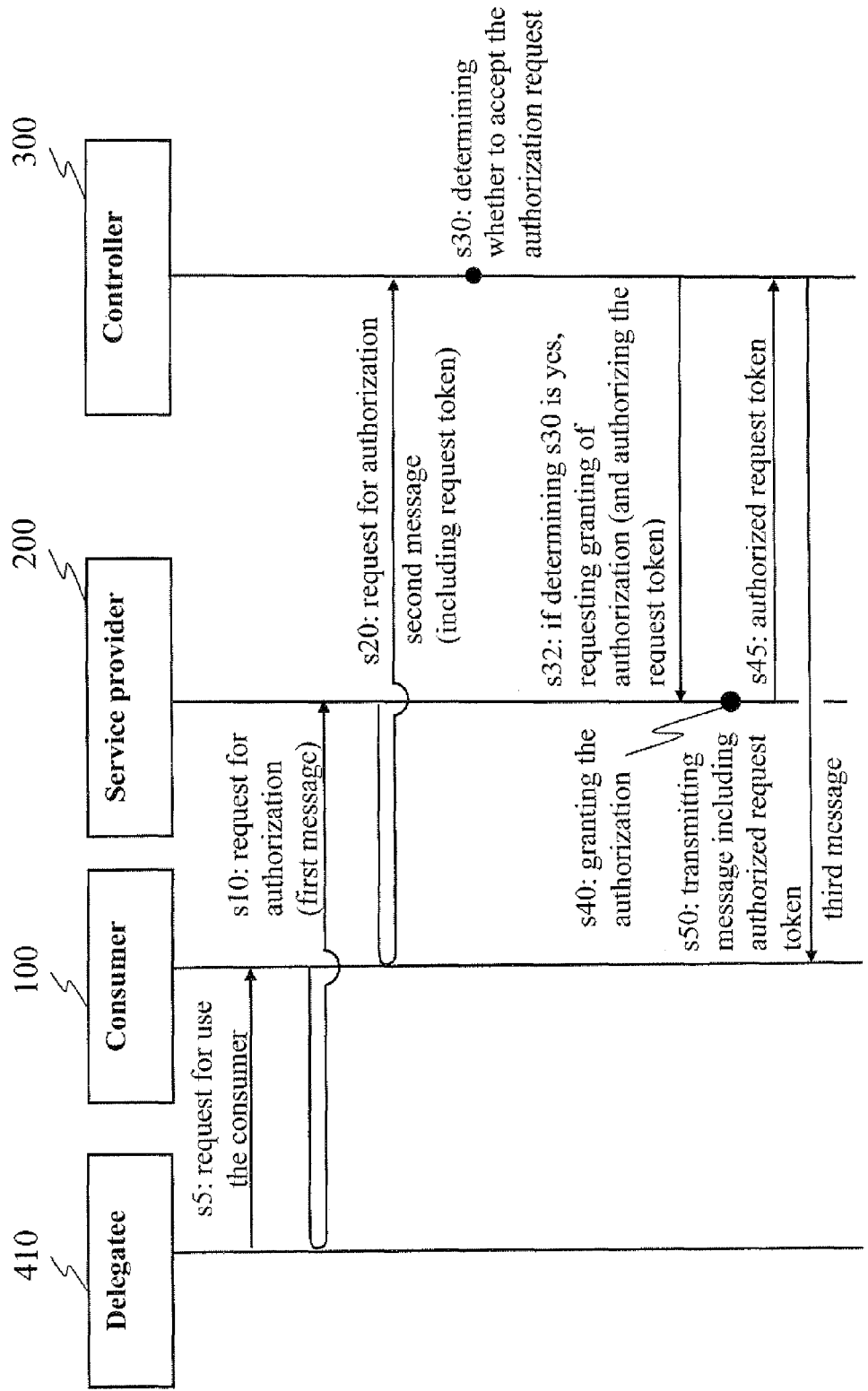
FIG. 6 is a schematic message diagram of a method in yet a further embodiment of the invention.

FIG. 6 is a schematic message diagram of a method in one embodiment of the invention, combining the embodiments illustrated in FIGS. 4 and 5. Namely, the first message sent s10 by the consumer 100 to the service provider 200 is sent s10 through the delegates 410. Furthermore, the second message sent s20 by the service provider 200 to the controller 300 is sent s20 through the consumer 100. This embodiment combines the advantages of the embodiments of FIGS. 4 and 5.

Figure 7:
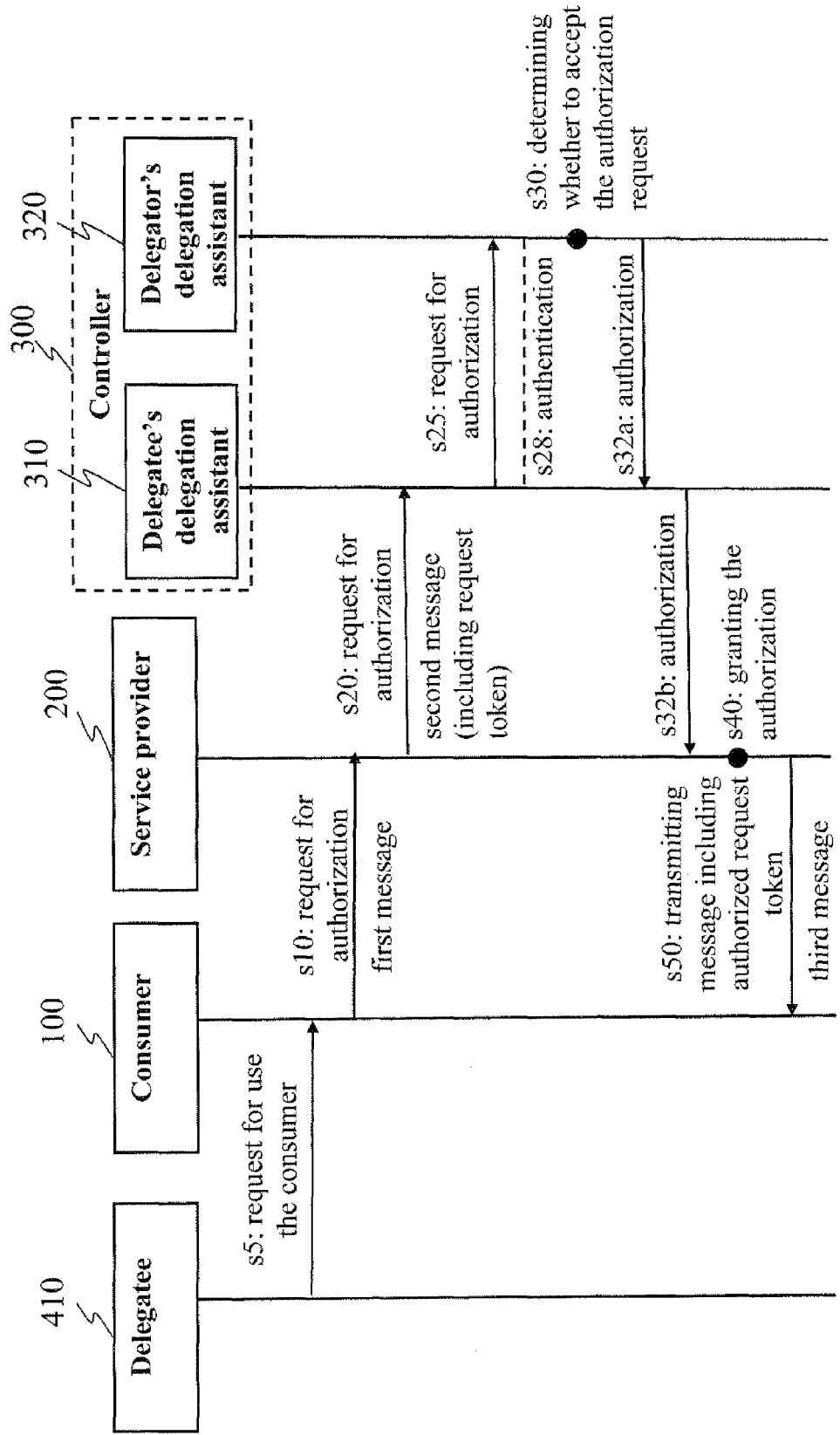
FIG. 7 is a schematic message diagram of a method in one embodiment of the invention, wherein the controller includes a delegatee's delegation assistant and a delegator's delegation assistant.

FIG. 7 is a schematic message diagram of a method in one embodiment of the invention, which differs from the embodiment illustrated in FIG. 3 as follows. The controller 300 includes a delegatee's 410 delegation assistant 310 and a delegator's 420 delegation assistant 320. Together, the delegatee's delegation assistant 310 and the delegator's delegation assistant 320 form the controller 300 or form a part of the controller 300 (since the controller 300 may include delegation assistants working for other users). The delegatee's delegation assistant 310 works for the delegates 410 to support the management of the delegation of authorities for the delegatee 410. The delegatee's delegation assistant 310 may be running in parallel to the delegatee's 410 web browser.

The delegator's delegation assistant 320 works for the delegator 420, and may run in parallel to the delegator's browser. In one embodiment, at least one of the delegatee's delegation assistant 310 and the delegator's delegation assistant 320 are hosted on a server. In this embodiment, the operation of a delegation assistant hosted on the server does not dependent on whether the user for which the delegation assistant works has started his or her web browser.

The service provider 200 sends s20 the request for authorization and the second message to the delegatee's delegation assistant 310. The delegatee's delegation assistant 310 then forwards s25 the request for authorization to the delegator's delegation assistant 320. An authentication may take place s28. Thereafter, the delegator's delegation assistant 320 determines s30 whether to accept the authorization request.

If the delegator's delegation assistant 320 accepts the authorization request, information that the authorization request has been accepted is transmitted s32a to the delegatee's delegation assistant 310, which forwards s32b this information to the service provider 200. The service provider 200 then grants s40 the authorization and the third message is transmitted s50 to the consumer 100 with the authorized request token. Therefore, the consumer 100 can use the protected resources of the delegator 420 hosted by the service provider 200.

The delegatee's delegation assistant 310 assists the delegatee 410 in obtaining a delegation of authorization to allow the delegatee 410 and any consumers 100 working on behalf thereof to access protected resource of the delegator 420 accessible from service providers 200. The function of the delegatee's delegation assistant 310 may include checking whether a request for authorization received from the service provider 200 meets the policy settings set for the delegates 410 in relation to the requests for authorizations sent on behalf of the delegates 410.

The delegator's delegation assistant 320 assists the delegator 420 in granting or denying delegations of authorization in relation to the access by delegatees 410, or any consumers working for delegatees, to protected resources of the delegator 420 accessible from service providers 200.

In other words, the delegatee's delegation assistant 310 is given an opportunity to intercept the second message, which includes the unauthorized request token. The delegatee's delegation assistant 310 prepares a request for delegation of authorization that it sends s25 to the delegator's delegation assistant 320. This request contains the unauthorized request token and information regarding the service provider 200 hosting the protected resource to which the request relates. The request may also contain information regarding the protected resource to which the requested authorization relates, the consumer 100 requesting access to the protected resource, and the delegatee 410 on behalf of which the consumer 100 works.

The delegator's delegation assistant 320, upon receipt of the message from the delegatee's delegation assistant 310 may decide to authenticate the delegatee 410. The delegatee's identity may have been received in the message received from the delegator's delegation assistant 310 or may be established by other means.

Figure 8:
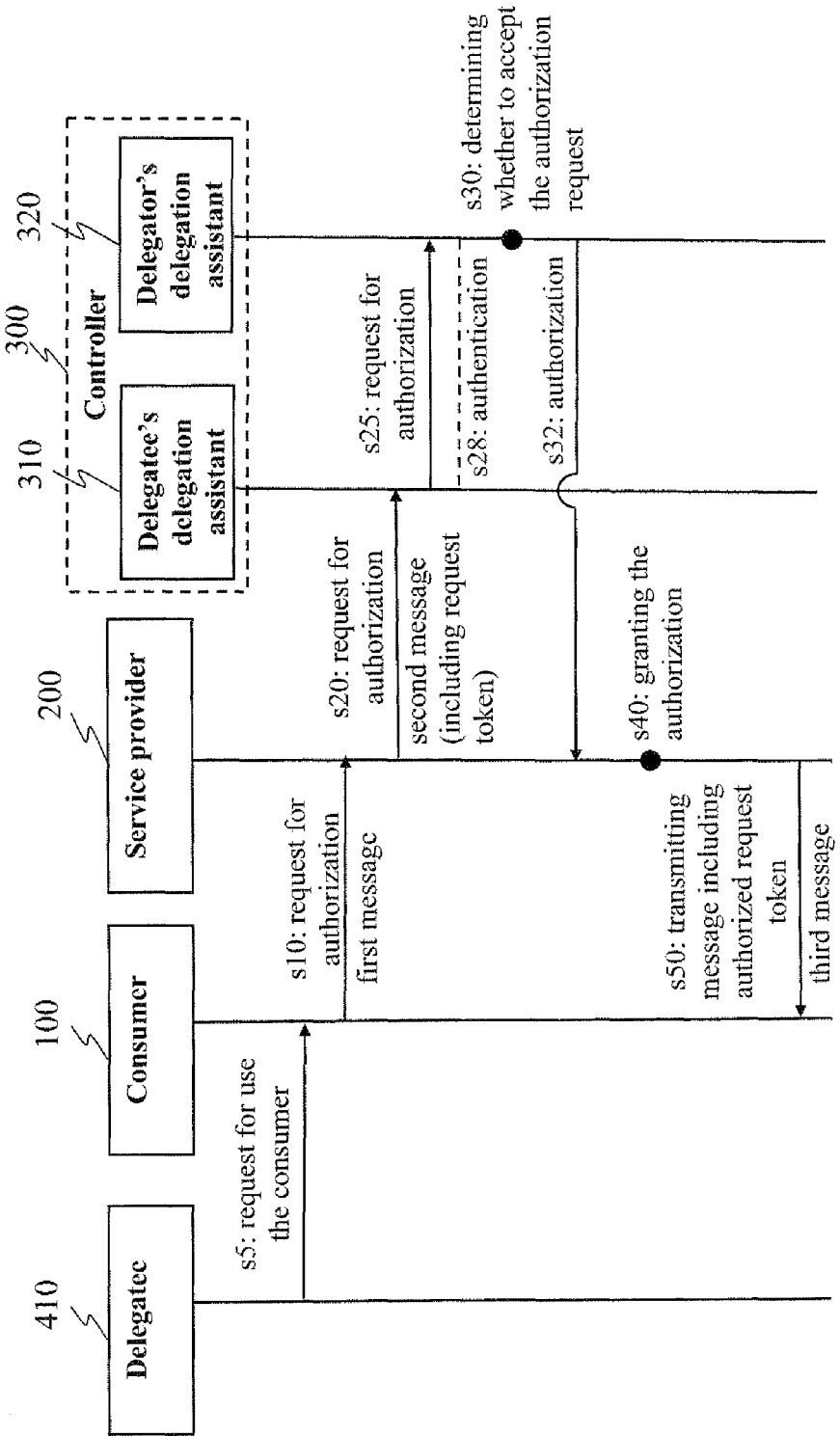
FIGS. 8 to 12 are schematic message diagrams of methods in further embodiments of the invention.

FIG. 8 is a schematic message diagram of a method in one embodiment of the invention, which differs from the embodiment illustrated in FIG. 7 as follows. The delegator's delegation assistant 320, after determining s30 whether to accept the authorization request, and after deciding to accept it, sends s32 the authorization directly to the service provider 200. Indeed, at that stage the intervention of the delegatee's delegation assistant 310 may no longer be necessary. It is however required that the delegator's delegation assistant 320 has the address of the service provider 200.

Figure 9:
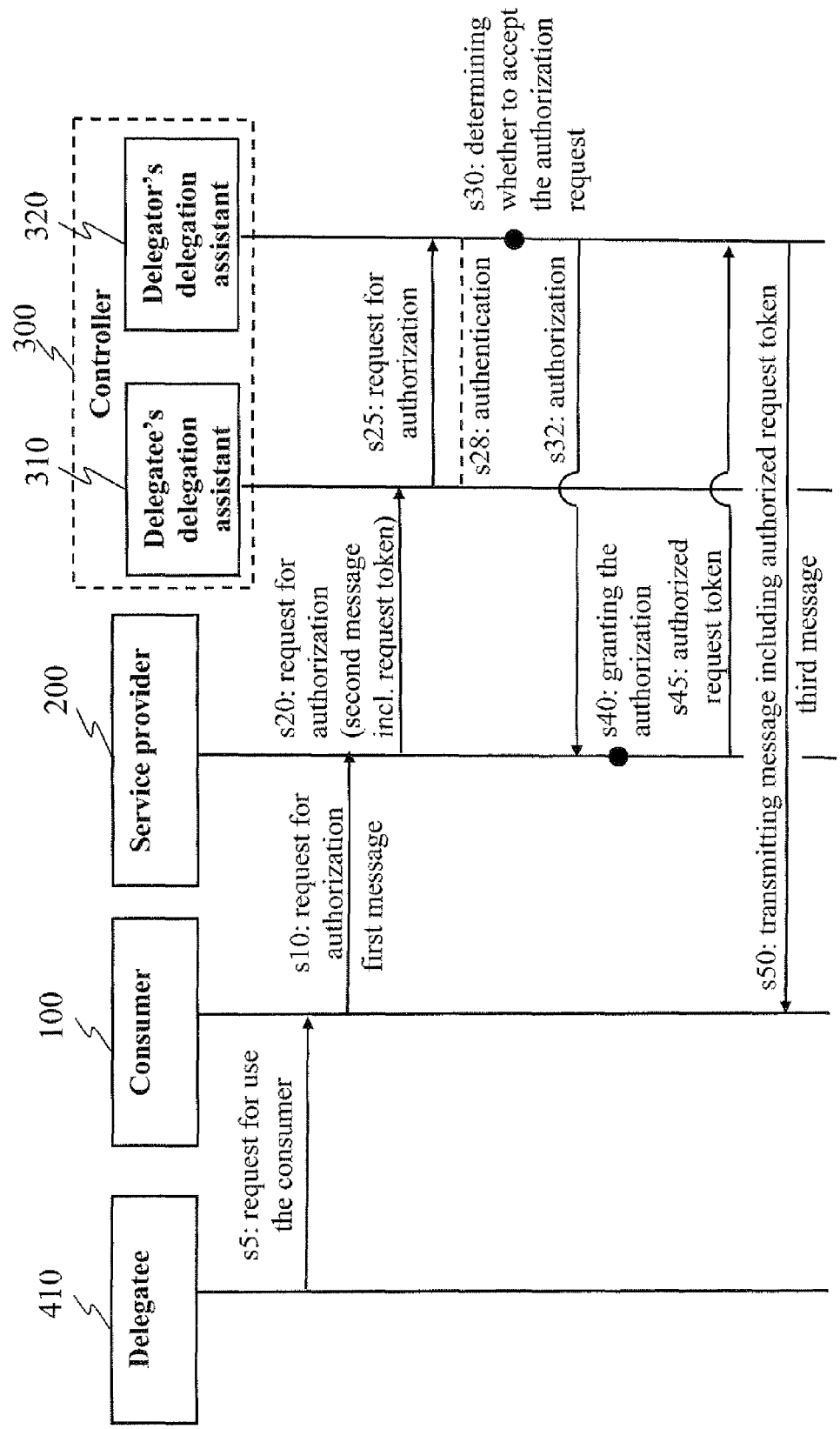

FIG. 9 is a schematic message diagram of a method in one embodiment of the invention, which differs from the embodiment illustrated in FIG. 8 as follows. The service provider 200, after granting s40 the authorization, and authorizing the request token, sends s45 the authorized request token to the delegator's delegation assistant 320. The delegator's delegation assistant 320 then transmits s50 the third message including the authorized request token to the consumer 100.

This embodiment gives the opportunity to the delegator's delegation assistant 320 to further restrict the granted authorization associated with the authorized request token, for instance to strengthen limitations on its use, such as to validity time frame, etc.

Figure 10:
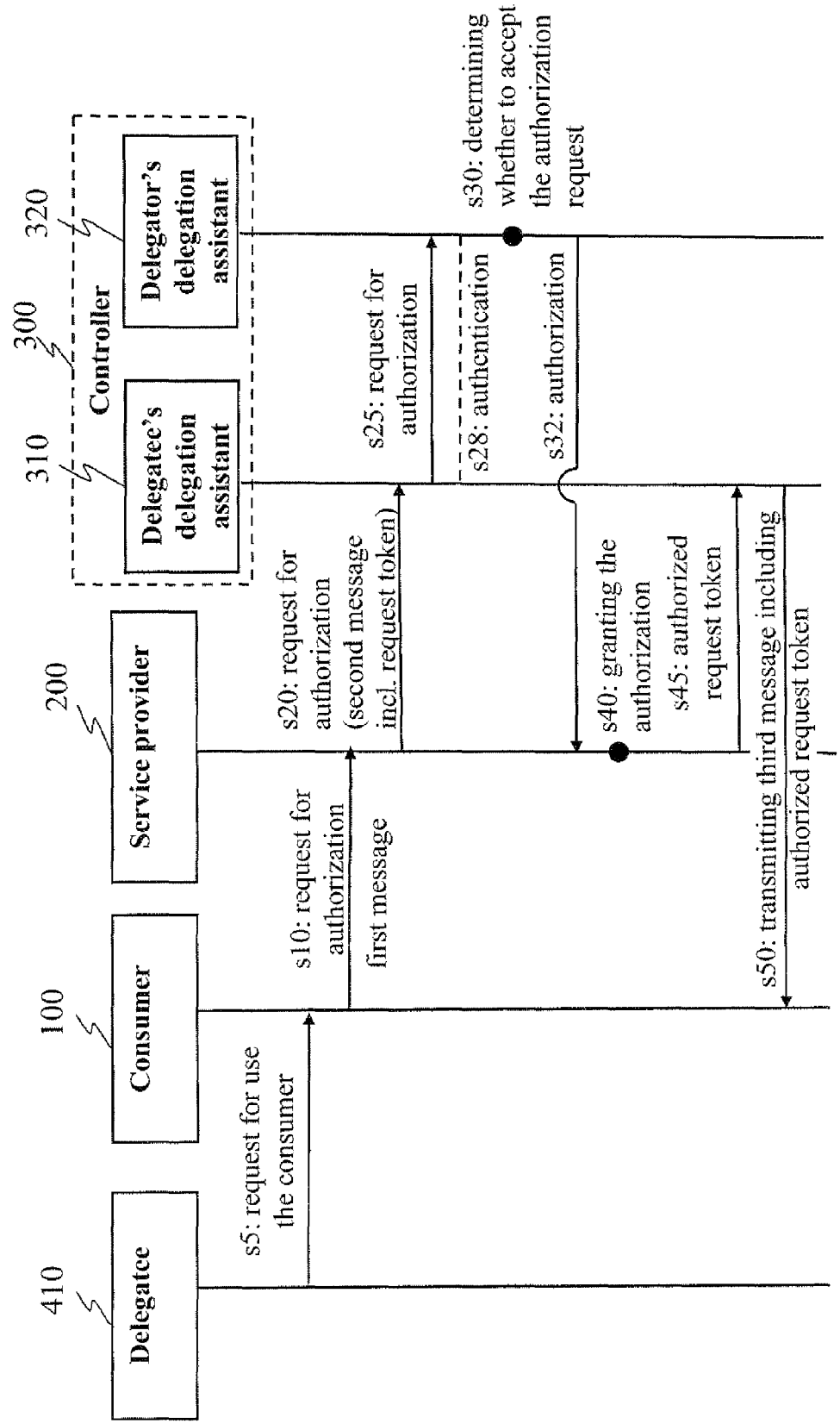

FIG. 10 is a schematic message diagram of a method in one embodiment of the invention, which differs from the method illustrated in FIG. 8 as follows. The service provider 200, after granting s40 the authorization, sends s45 the authorized request token to the delegatee's delegation assistant 310. The delegatee's delegation assistant 310 may therefore log the information for statistical purposes or the like, and then transmits s50 the third message including the authorized request token to the consumer 100. The consumer 100 may then, with the authorized request token, access the protected resource of the delegator 420 from the service provider 200.

Figure 11:
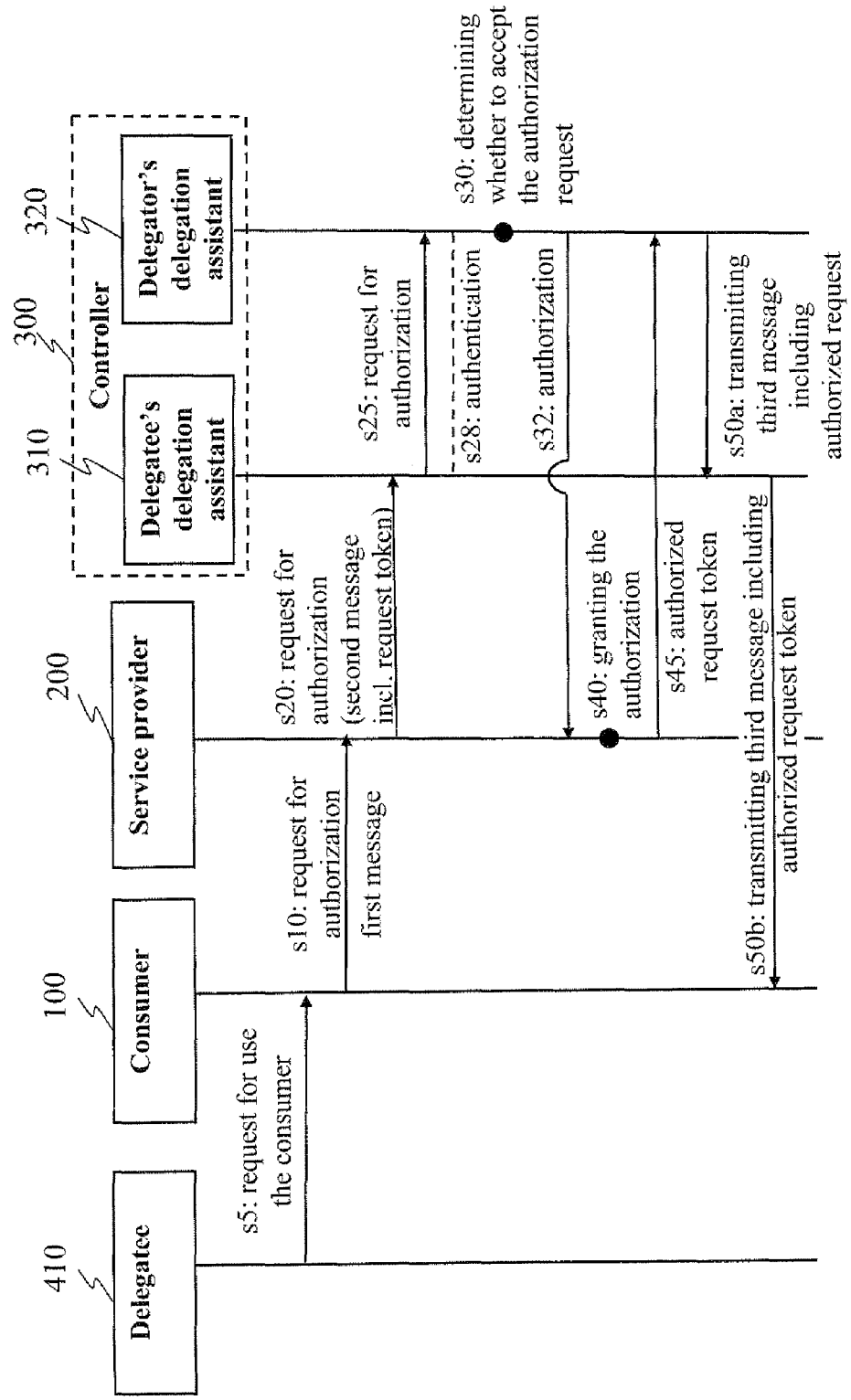

FIG. 11 is a schematic message diagram of a method in one embodiment of the invention, which differs from the method illustrated in FIG. 8 as follows. The service provider 200, after granting s40 the authorization and issuing the authorized request token, sends s45 the authorized request token to the delegator's delegation assistant 320. The delegator's delegation assistant 320 then sends s50a the third message including the authorized request to the delegatee's delegation assistant 310, which forwards it s50b to the consumer 100. This embodiment combines the advantages of the embodiments illustrated in FIGS. 9 and 10.

Figure 12:
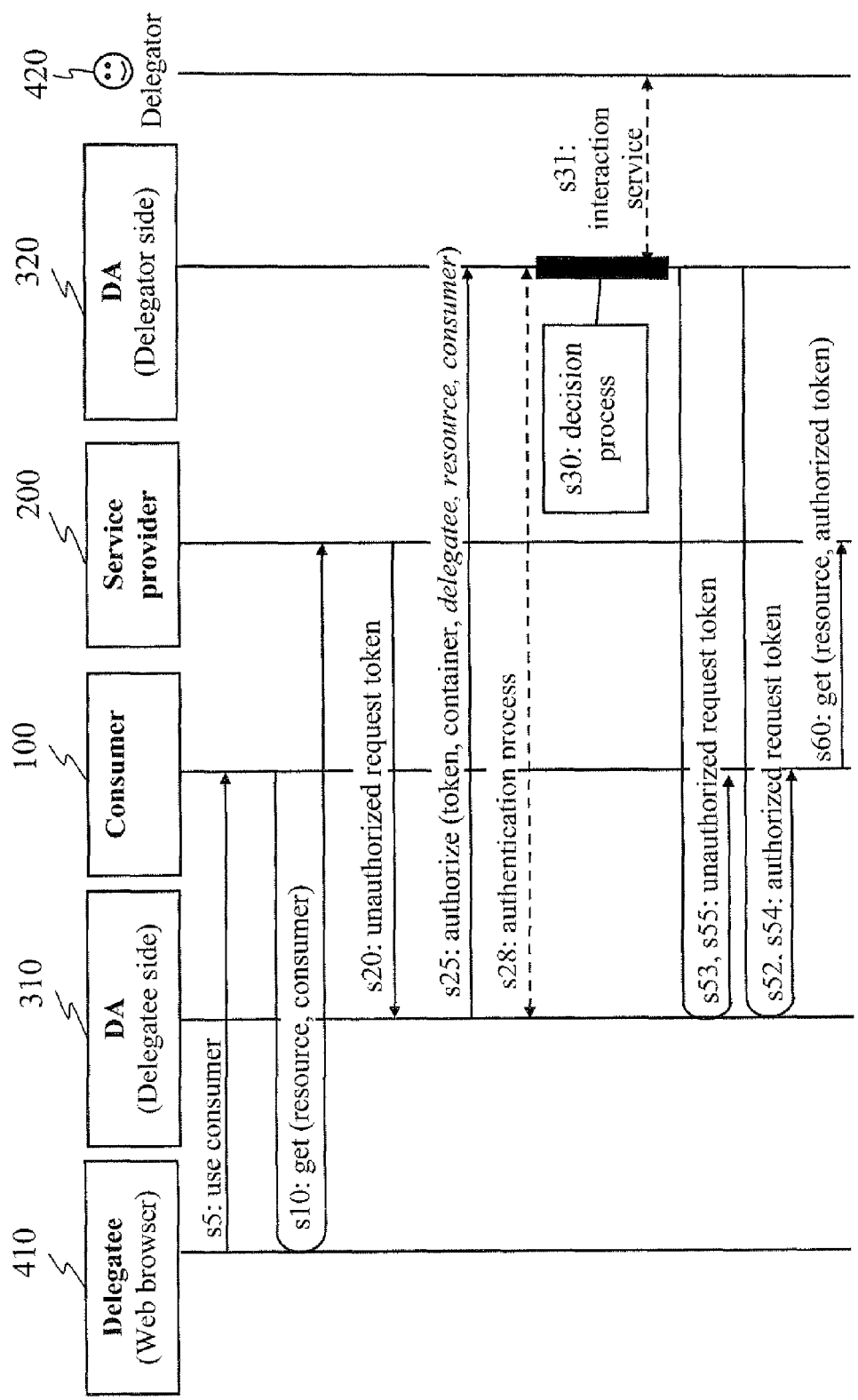

FIG. 12 is a schematic message diagram of a method in one embodiment of the invention. This embodiment, allowing the delegation of authorization from a delegator 410 to a delegatee 420 on a delegatee-initiated basis, will now be described with reference towards FIGS. 12 and 13.

The delegatee 410 invokes s5 a consumer service or application 100 that requires the access to a delegator's 420 protected resource hosted in, or accessible from, a service provider 200, also called "container" (labelled on FIG. 12: "s5: use consumer"). This step s5 may involve invoking a URL from a web browser, but is not limited thereto.

The consumer 100 responds s10 to the invocation with a first message ("s10: get (resource, consumer)"). Such message includes, or represents, a request for the delegator's protected resource hosted in, or accessible from, the service provider 200. The first message is sent s10 through the delegatee 410, e.g. redirecting the first message through the delegatee's web browser.

The service provider 200 receives the first message and evaluates the request for the protected resource. If the request is not already authorized at that stage by the service provider 200, the service provider 200 responds s20 with a second message, which includes a request for authorization with an unauthorized request token ("s20: unauthorized request token"). The unauthorized request token may or may not relate to a specific protected resource, delegatee 410 or consumer 100. This is up to the service provider implementation.

The delegatee's delegation assistant 310 ("DA (Delegatee side)", wherein DA stands for delegation assistant) intercepts the second message, which includes the unauthorized request token. The delegatee's delegation assistant 310 prepares a request for delegation of authorization that it sends s25 to the delegator's delegation assistant 320 ("s25: authorize (token, container, delegatee, resource, consumer)"). The request contains the unauthorized request token and information regarding the service provider 200 hosting the requested protected resource. The request may also contain information regarding the protected resource for which authorization is requested, the consumer 100 who is requesting access to the protected resource and the delegatee 410 that is invoking the consumer 100.

Upon receipt of the message, the delegator's delegation assistant 320 may decide to authenticate the delegatee 410 ("s28: authentication process"). The delegatee identity may have been received in the message from the delegatee's delegation assistant 310 or can be established by other means.

After completion of the previous processes, the delegator's delegation assistant 320 begins a decision process ("s30: decision process"). The goal of the decision process is to decide to deny the delegation of authorization or to grant it.

Figures 13, 14:
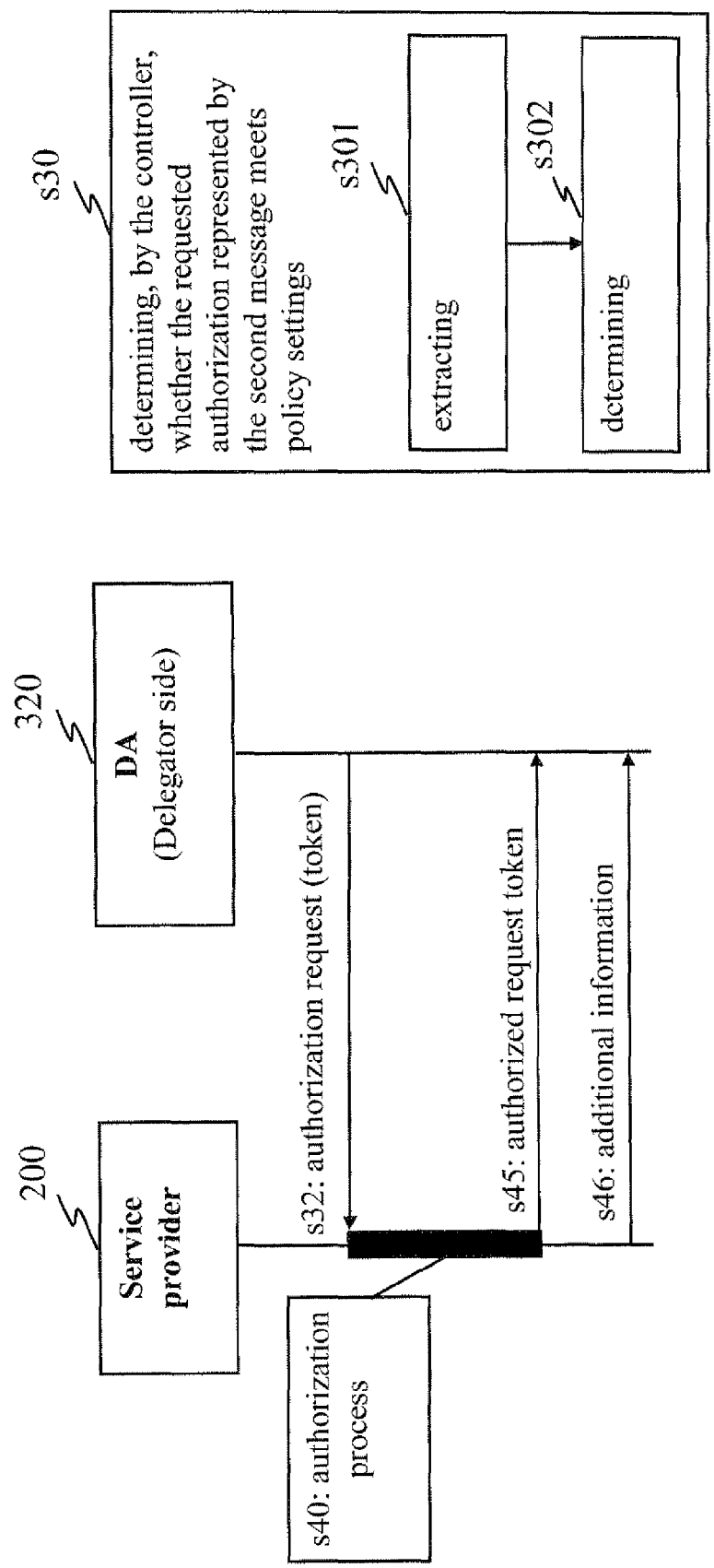
FIG. 13 is a schematic message diagram of a portion of the method illustrated in FIG. 12.
FIG. 14 is a flowchart of a method in one embodiment of the invention.

As part of the decision process s30, the delegator's delegation assistant 320 sends s32 an authorization request to the service provider 200 that hosts, or provides access to, the protected resources to which the unauthorized request token refers to, as illustrated in FIG. 13 ("s32: authorization request (token)"). The particular authorization process s40 that the service provider 200 carries out depends on the service provider's implementation ("s40: authorization process").

As a result of a successful authorization process, the service provider 200 sends s45 an authorized request token to the delegator's delegation assistant 320 ("s45: authorized request token"). This request token will allow the delegatee 410, or the consumer 100 working on behalf of this delegatee 410, to gain access to the protected resource hosted in the service provider 200. The request token may further include limitations on its use, such as the validity time frame, the consumer application used or others.

Additionally, the service provider 200 may provide the delegator's delegation assistant 320 with information regarding the consumer 100 requesting access to the protected resource or regarding the protected resource itself ("s46: additional information").

Advantageously, at any time during the decision process s30, the delegator's delegation assistant 320 may decide to ask the delegator 420 for further information to be incorporated into the decision process ("s31: interaction service"). This interaction process may take the form of an exchange of messages between the delegator's delegation assistant 320 and the delegator 420.

In addition, the decision process s30 may also take into account further information previously stated by the delegator 420, such as policies governing the delegation of authorization or the like. The delegator's delegation assistant 320 may retrieve, store and enforce the delegator's preferences using any computer-implemented processes, for instance including querying a database storing delegator's policies, parsing messages representing the request, comparing values of messages and stored policies, and the like.

After completion of the decision process, the delegator's delegation assistant 320 grants or denies the delegation of authorization.

If the outcome of the decision process s30 is deny, the delegator's delegation assistant 320 responds to the message from the delegatee's delegation assistant 310 with an unauthorized message ("s53, s55: unauthorized request token"). The delegatee's delegation assistant 310 may redirect this message to the consumer 100.

If the outcome of the decision process s30 is grant, the delegator's delegation assistant 320 responds to the message from the delegatee's delegation assistant 310 by sending a message to the delegatee's delegation assistant 310 that includes the authorized request token received in step s45 from the service provider 200 ("s52, s54: authorized request token"). The delegatee's delegation assistant 310 sends this authorized request token back to the consumer 100. The consumer 100 uses the authorized request token to gain access to the protected resource on behalf of the delegatee 410 ("s60: get (resource, authorized token)").

The embodiment illustrated in FIGS. 12 and 13 is notably advantageous in that the exchange of messages is simplified, since the delegator's delegation assistant 320 knows the address of the delegatee's delegation assistant 310 because it received a message from it previously (in step 25). Additionally, since the authorized request token is sent from the delegator's delegation assistant 320 through the delegatee's delegation assistant 310 to the consumer 100, the delegatee's delegation assistant 310 can trace the requests for authorization that it begins and the outcome of the process.

In one embodiment, the delegatee's delegation assistant 310 runs in parallel to the delegatee's browser. The same applies for the delegator's delegation assistant 320 if the delegator 420 is online. In a sub-embodiment, the delegatee's delegation assistant 310 runs in parallel to the delegatee's browser in the form of a browser add-on. In a sub-embodiment, the delegator's delegation assistant 320 runs in parallel to the delegator's browser in the form of a browser add-on. In another embodiment, a third party (such as a mobile operator) plays the role of delegator assistant and a proxy is used to catch the authorization messages addressed to its subscribers.

FIG. 14 is a flowchart of the determining step s30 in a method in one embodiment of the invention. In this embodiment, the step of determining s30, by the controller 300, whether the requested authorization represented by the second message meets policy settings includes a step of extracting s301 and a step of determining s302.

The step of extracting s301 includes extracting from the second message at least one of information about the consumer 100 from which the requested authorization originates; information about the delegatee 410 on behalf of which the consumer 100 requests authorization to access the protected resources of the delegator 420; information about the protected resources on which one or more operations are requested to be authorized by means of the token, and information about the one or more operations which are requested to be authorized by means of the request token. The step of determining s302 includes determining whether the extracted information meets policy settings.

Sub-step s301 of extracting information from the message may include parsing the message.

Figure 15:
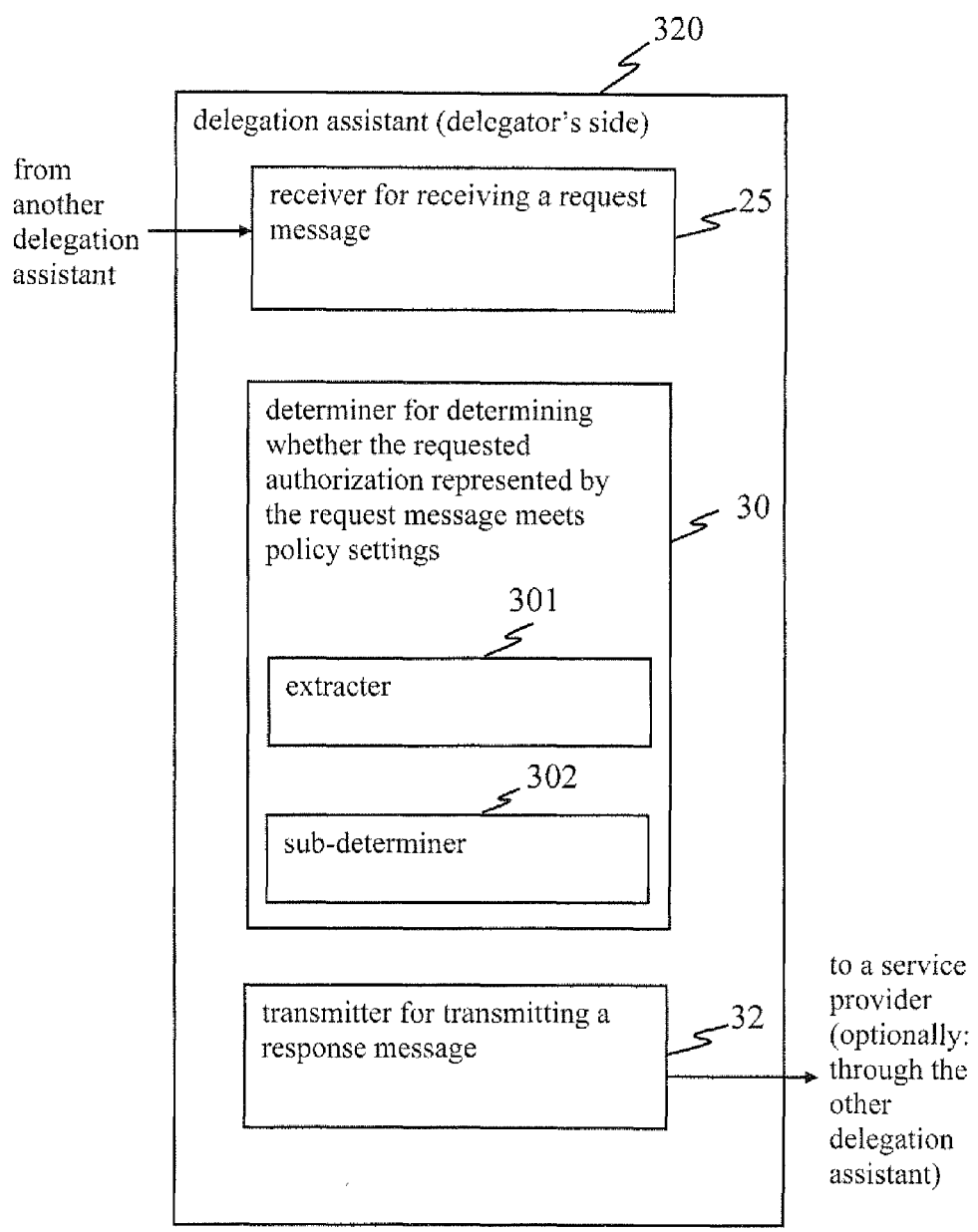
FIG. 15 schematically illustrates a delegator's delegation assistant in one embodiment of the invention.

FIG. 15 schematically illustrates a delegation assistant 320, and some of its constituent elements, in one embodiment of the invention. The delegation assistant 320 includes a receiver 25 configured for receiving a request from another delegation assistant (this request corresponds to the second message mentioned above). The delegation assistant 320 further includes a determiner 30 configured for determining whether the requested authorization meets policy settings governing the access to protected resources. The policy settings may be stored in the delegation assistant 320 or may be stored in a database or memory unit accessible by the delegation assistant 320. If the delegation assistant 320 determines that the requested authorization does not comply with the policy settings, the service provider 200 is informed that the requested authorization must not be granted. The determiner 30 may comprise an extracter 301 configured for extracting from the request message at least one of (i) information about the consumer 100 from which the requested authorization originates; (ii) information about the delegatee 410 on behalf of which the consumer 100 requests authorization to access the protected resources of the delegator 420; (iii) information about the protected resources on which one or more operations are requested to be authorized by means of the request token; and (iv) information about the one or more operations which are requested to be authorized by means of the request token. The determiner 30 may also comprise a sub-determiner 302 configured for determining whether the extracted information meets the policy settings. Moreover, the delegation assistant 320 also includes a transmitter 32 for transmitting a response message to the service provider.

The management of privacy settings (also called "policy settings") by a user, or user terminal, in a controller 100, in one embodiment of the invention will now be described.

A user (acting as delegator) wishes to set privacy preferences to govern the use and release of his or her protected resources. The controller 300 may show different options to the user and allows him or her to configure different parameters such as the conditions under which the protected resources can be accessed, i.e. used or released. When done, the controller 300 stores the resulting policy settings. Afterwards, whenever a consumer 100 requires authorization on behalf of another user (a potential delegatee) to access the protected resources, the controller 100 enforces the user's preferences, i.e. the policy settings.

Users benefit from being able to set their preferences regarding access to their protected resources. To this end, users set privacy preferences in the controller 300 and, afterwards, the controller 300 enforces these privacy preferences.

The variables that participate in the definition of the policy settings may include: requestor, delegatee, resource, operation and permission. The user (delegator) may need to be explicitly stated in the policy settings, if the user (delegator) is not the sole user of the controller 300.

The requestor may be any consumer 100 trying to gain access to the user's protected resources.

The delegatee may be any delegatee 410 on behalf of which a consumer 100 could try to gain access to the user's protected resources.

The resource may be the identifier of the protected resources concerned by the policy settings rule.

The operation values may be the operations that any consumer 100 can request, for example, they may be "query", "create" and "delete". The embodiment of the invention is not limited however to any number or type of operations that may be the subject to policy settings rules.

The permission may be set to "grant", "deny" or "askMe" (when the user, i.e. the delegator, prefers to decide on a per invocation basis; this can be implemented by means of an ad-hoc interaction service e.g. pop-ups in a browser, SMS-based authorization, etc.)

Users may be provided with the opportunity to express their privacy preferences through different means. First, the users may choose one out of several pre-defined privacy policies and associate it to a protected resource. These pre-defined privacy policies may be described in natural language so that non-technically skilled users can understand them. This natural language description is mapped to a specific policy implementation described in a privacy policy expression language. These policies are hierarchical so that it is easier for users to compare among them and choose the one that better suits their needs. The approach benefits from the simplicity and usability of the model because users do not have to deal with the policy details.

Users may also be allowed to define each detail of the privacy policy. Although this approach provides greater flexibility in the description of users preferences, it may cause some risks for the usability. Just advanced users may understand (and probably wish to know) the meaning of the policy. This may be offered as an advanced option.

In one embodiment, the method further includes a step of obtaining, from at least one service provider 200, information regarding the protected resources associated to a user's identity in the at least one service provider 200. This enables a user to obtain a view of the protected resources that are accessible from a service provider 200. This improves how privacy management can be carried out.

In a sub-embodiment of this embodiment, the information that the controller 300 (acting as the user's delegation assistant) can obtain regarding the protected resources associated to a user's identity in the at least one service provider 200 includes information regarding the usage of the protected resources associated to a user's identity in the at least one service provider 200.

Thus, in that case, the controller 300 does not only act as the user's delegation assistant, but has additionally inventory capabilities. This embodiment enables the users to obtain, through the controller 300 (acting as the user's delegation assistant), a dynamic view of the protected resources associated with their identity. The controller 300 may thus act as a central point of control in that respect, for a user.

The obtainable view may be dynamic in the sense that the users can obtain information on how and when, i.e. when during at least a period of time, the protected resources have been used by which consumers and on behalf of which users (i.e., which delegatees). The users (i.e. the delegators) can thus collect information about the usage of their protected resources. The users may then decide whether to modify the policy settings in the controller based on this knowledge. The usage history retrieval may be performed by the controller upon receiving an express request from a user. Alternatively, the controller may be configured, either based on an initial interaction with a user or based on default settings, to retrieve the usage history of the protected resources associated with the user's identity.

An identity, and more specifically a user's identity, is one of the characteristics of the user which identifies it or which is mapped in some way to the user to identify it.

The usage information may notably include information about one or more of: the type of a protected resource, timestamps of access to the protected resources, identifiers of consumers which access, have accessed, use, or have used the identity resource, and identifiers of delegatees on behalf of which consumers access, have accessed, use, or have used the protected resource.

In one embodiment, the method further includes recording information, here referred to as history information, regarding received second messages and whether the requested authorization represented by the second messages have been determined to meet policy settings. The method then includes a step of making available the history information to a user or to its user terminal.

In one embodiment, the method is additionally carried out by a user terminal capable of communicating with the controller 300, and the method further includes setting, by the user terminal, the policy settings in the controller 300.

Figure 16:
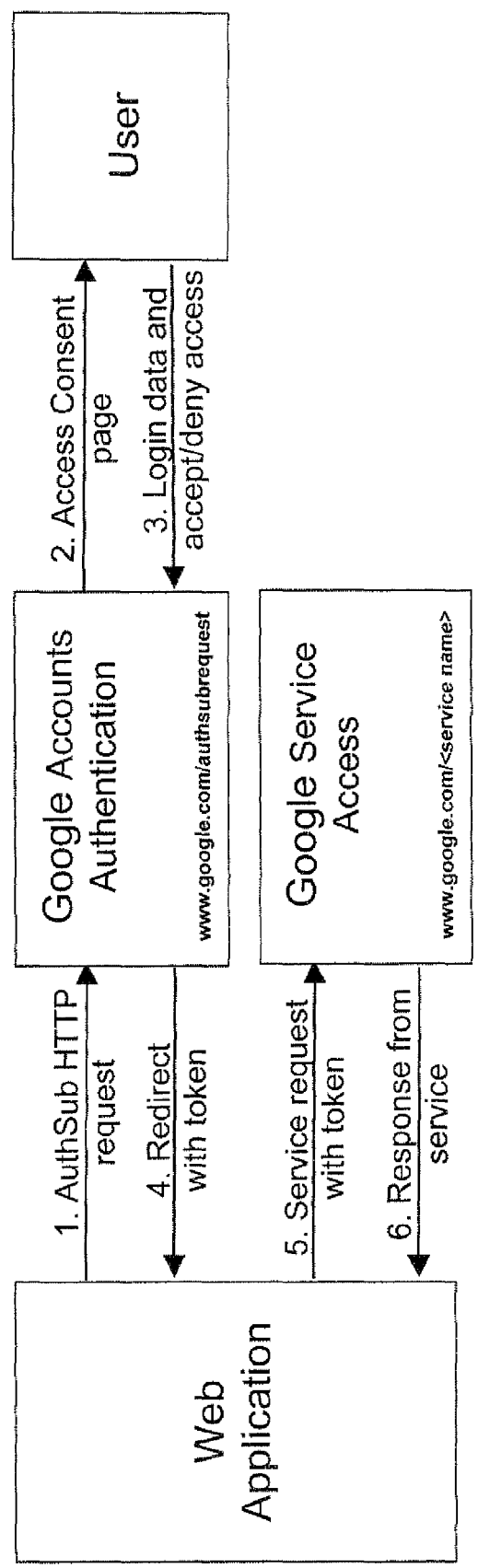
FIGS. 16 and 17 are message diagrams of methods illustrated to explain the problems addressed and the advantages provided by embodiments of the invention over the prior art.
Figure 17:
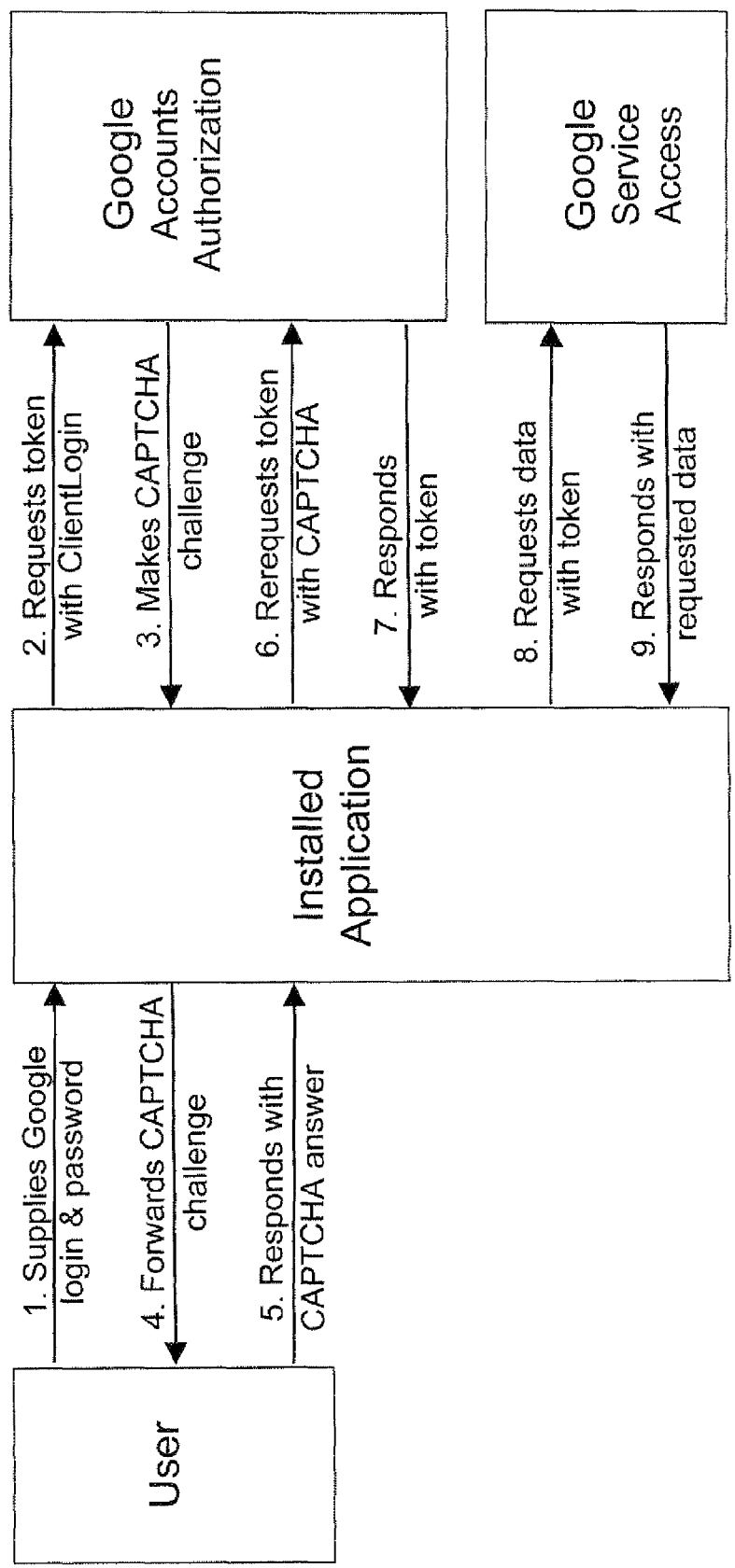

In order to further illustrate and understand some of the problems addressed by the invention, FIGS. 16 and 17 explain two methods for providing access to user data, i.e. respectively AuthSub API (see Google web site, "Accounts API, AuthSub for Web Applications", retrieved on Feb. 17, 2010 from http://code.google.com/apis/accounts/docs/AuthSub.html) and ClientLogin (see Google web site, "Accounts API, ClientLogin for Installed Applications", retrieved on Feb. 17, 2010 from http://code.google.com/apis/accounts/docs/AuthForInstalledApps.html).

Considering AuthSub API, let us use a use case to illustrate how it may work, with reference to FIG. 16. Let us consider a Web 2.0 application to buy a ticket for a movie. At the same time, this web application also accesses a user's Google Calendar data to personalize its offer. The use case may be as follows:

(i) Jane (illustrated on right-hand side of FIG. 16, "User") accesses the movie ticket web application (illustrated on left-hand side of FIG. 16, "Web Application"), asking for available movies that fit in her current calendar for this week.
(ii) The web application redirects Jane to Google Accounts, for Jane to be authenticated (using her Google credentials) and to acknowledge that the web application may access her Google Calendar information (steps 1, 2 in FIG. 16).
(iii) Jane authenticates and consents (step 3 in FIG. 16).
(iv) Jane is redirected back to the web application and the web application receives a token that can be used to subsequently query Jane's Google Calendar (step 4 in FIG. 16).
(vi) The web application obtains the information from Jane's Google Calendar (steps 5, 6 in FIG. 16).
(vii) The web application then presents the list of available movies, but only those that fit in Jane's Calendar for this week (personalization) (not illustrated in FIG. 16).

Therefore, as illustrated in FIG. 16, a protocol which may be based on HTTP Redirect is used to redirect the user to Google Accounts, credentials are not shared with the web application, and upon user's authentication (and implicit authorization) a token is retrieved. A scenario wherein a delegator delegates authority to a delegates is however not supported.

When it comes to ClientLogin, a slightly different example may be used: a corporate email client that may display information stored in the user's Google Calendar (personal) together with the information of his/her corporate calendar. The use case would work as follows, as illustrated in FIG. 17:

(i) John opens the corporate email client in his laptop, asks for the email client to display John's agenda (incorporating personal information from John's Google Calendar, and professional info from John's corporate calendar).
(ii) The email client asks John to provide his Google credentials. John supplies his credentials (step 1 in FIG. 17).
(iii) The email client contacts Google Accounts with such information (step 2 in FIG. 17).
(iv) Google Accounts authenticates John, provides a token that can be used by the email client to subsequently access John's Calendar in Google (step 7 in FIG. 77). Optionally, Google Accounts may answer with a CAPTCHA (steps 3 to 6 in FIG. 17).
(v) The email client accesses John's Google Calendar with such a token, retrieves John's Calendar info (step 8 in FIG. 17).
(vi) The email client displays John's combined calendar information.

Therefore, as illustrated in FIG. 17, the application handles users' credentials and supplies them to the Google Accounts service. This allows the consumer to impersonate the user and, therefore, this should be avoided.

The invention addresses and attempts to partially or completely avoid these problems. Some of the advantages of the invention are therefore as follows:

The delegator's credentials are not released for use by the consumer 100. The owner of the protected resources, i.e. the delegator 420, is not required to disclose the delegator 420 credentials used to access the service provider 200.

Furthermore, no federated relationship of trusted consumers 100 and service providers 200 is needed. The consumers 100 and service providers 200 may run on different computers and in different administrative domains. The service provider 200 is not required to setup in advance a trust relationship with the consumer 100 and/or delegates 410. The method of the invention does not require a trust relationship between delegatee 410 and consumer 100, consumer 100 and service provider 200, or delegatee 410 and service provider 200, but just a trust relationship between delegator 420 and service provider 200, as explained above. Namely, the delegator 420 must trust that the service provider 200 will not grant an authorization that the delegator 420 has not approved.

Yet furthermore, authorizations may be granted on a per-delegatee-request basis, following a delegatee-initiated procedure.

Yet furthermore, the method of the invention allows automated decisions to be taken regarding the delegation of authorization based on previously stated rules. The method may also allow online interaction with the protected resource owner, namely the delegator 420.

The physical entities according to the invention, including the controllers, service providers, consumers, delegation assistants and user terminals may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms such as "receiver", "determiner", "extracter", "sub-determiner", and "transmitter", are used herewith, no restriction is made regarding how distributed these elements may be and regarding how gathered elements may be. That is, the constituent parts of these elements may be distributed in different software or hardware components or devices for bringing about the intended function. A plurality of distinct elements may also be gathered for providing the intended functionalities.

Any one of the above-referred elements of a controller may be implemented in hardware, software, field-programmable gate array (FPGA), application-specific integrated circuit (ASICs), firmware or the like. The same applies to user terminals, consumers and service providers.

In further embodiments of the invention, any one of the above-mentioned receiver, determiner, extracter, sub-determiner, and transmitter may be replaced by receiving means, determining means, extracting means, sub-determining means, and transmitting means, respectively, or by a receiving unit, determining unit, extracting unit, sub-determining unit, and transmitting unit respectively, for performing the functions of the receiver, determiner, extracter, sub-determiner, and transmitter.

In further embodiments of the invention, any one of the above-described steps may be implemented using computer-readable instructions, for instance in the form of computerunderstandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method carried out at least by a consumer, a service provider, and a controller, wherein
   a service provider is at least one of a software application and a web site that is configured to provide access to protected resources; and
   a consumer is at least one of a software application and a web site that is configured to access a service provider on behalf of a user without knowing the user credentials for the service provider;
   the method comprising:
       transmitting, by the consumer to the service provider, a first message representing a request for authorization to access by the consumer on behalf of a first user, here referred to as delegatee, the protected resources of a second user, here referred to as delegator, from the service provider;
       transmitting, by the service provider to the controller, a second message representing the request for authorization to access by the consumer on behalf of the delegatee the protected resources of the delegator from the service provider, the second message including a request token, wherein a request token is a value used by a service provider to register a requested authorization to access protected resources;
       determining, by the controller, whether the requested authorization represented by the second message meets policy settings governing the access to protected resources of the delegator; and,
       if it is determined that the requested authorization meets the policy settings,
           granting, by the service provider, the authorization registered by the request token;
           transmitting, by at least one of the controller and the service provider, to the consumer, a third message including the request token; and
           accessing, by the consumer, on behalf of the delegatee, the protected resources of the delegator from the service provider, the consumer using the request token to do so without knowing the user credentials for the service provider.

2. The method of claim 1, further including:
   before the step of transmitting, by the consumer to the service provider, the first message,
   transmitting, by at least one of a software application and a physical device controlled by the delegatee, to the consumer, a request for a service involving access by the consumer on behalf of the delegatee to the protected resources of the delegator from the service provider.

3. The method of claim 1, wherein the step of transmitting, by the consumer to the service provider, the first message includes:
   transmitting the first message by the consumer to the service provider through at least one of a software application and a physical device controlled by the delegatee.

4. The method of claim 1, further including,
   between the steps of
   determining, by the controller, whether the requested authorization represented by the second message meets policy settings governing the access to protected resources of the delegator, and
   granting, by the service provider, the authorization registered by the request token,
   and, if it is determined that the requested authorization meets the policy settings,
       transmitting, from the controller to the service provider, a message indicating that the requested authorization represented by the second message can be accepted.

5. The method of claim 1, further including,
   between the steps of
   granting, by the service provider, the authorization registered by the request token, and
   transmitting, by at least one of the controller and the service provider, to the consumer, the third message including the request token;
   transmitting, from the service provider to the controller, a message including the request token for which the authorization has been granted.

6. The method of claim 1, wherein the step of transmitting, to the consumer, the third message including the request token is performed from the controller.

7. The method of claim 1, wherein the controller comprises:
   a delegation assistant being executed on behalf of the delegatee, and
   a delegation assistant being executed on behalf of the delegator,
   wherein a delegation assistant is at least one of a software application and a physical device.

8. The method of claim 1, wherein
   determining, by the controller, whether the requested authorization represented by the second message meets policy settings governing the access to protected resources of the delegator includes:
   extracting from the second message at least one of:
       information about the consumer from which the requested authorization originates;
       information about the delegatee on behalf of which the consumer requests authorization to access the protected resources of the delegator;
       information about the protected resources on which one or more operations are requested to be authorized by means of the request token; and
       information about the one or more operations which are requested to be authorized by means of the request token; and
   determining whether the extracted information meets the policy settings.

9. A delegation assistant comprising:
   a receiver configured to receive, from another delegation assistant, a message, here referred to as request message, representing a request for authorization to access by a consumer on behalf of a first user, here referred to as delegatee, the protected resources of a second user, here referred to as delegator, a service provider, the request message including a request token, wherein
   a service provider is at least one of a software application and a web site that is configured to provide access to protected resources;
   a consumer is at least one of a software application and a web site that is configured to access a service provider on behalf of a user without knowing the user credentials for the service provider; and a request token is a value used by a service provider to register a requested authorization to access protected resources;

a determiner configured to determine whether the requested authorization represented by the request message meets policy settings governing the access to protected resources of the delegator; and, a transmitter configured to, if it is determined that the requested authorization meets the policy settings, transmit, to the service provider, a response message indicating that the requested authorization represented by the request message can be granted.

10. The delegation assistant of claim 9, wherein the determiner includes:

an extracter configured to extract from the request message at least one of:
- information about the consumer from which the requested authorization originates;
- information about the delegatee on behalf of which the consumer requests authorization to access the protected resources of the delegator;
- information about the protected resources on which one or more operations are requested to be authorized by means of the request token; and
- information about the one or more operations which are requested to be authorized by means of the request token; and a sub-determiner configured to determine whether the extracted information meets the policy settings.

11. The delegation assistant of claim 9, configured to be executed in parallel to a browser.

12. The delegation assistant of claim 11, configured to be executed in parallel to a browser as an add-on to the browser.

13. The delegation assistant of claim 9, configured to be executed on a server.

14. The delegation assistant of claim 9, wherein the transmitter is further configured to transmit, to the other delegation assistant or to yet another delegation assistant, a message, here referred to as second request message, representing a request for authorization to access by the consumer or another consumer on behalf of the second user the protected resources of the first user or of a third user, here referred to as second delegator, from the service provider or from another servicer provider, wherein the request message includes another request token.

15. A non-transitory, computer-readable storage medium storing a computer program including instructions configured, when executed on a server or on a computer, to cause the server or the computer respectively to operate as a delegation assistant as defined in claim 9.

* * * * *

UNITED STATES PATENT AND TRADEMARK OFFICE
CERTIFICATE OF CORRECTION

PATENT NO. : 8,819,784 B2  
APPLICATION NO. : 13/579643  
DATED : August 26, 2014  
INVENTOR(S) : Monjas Llorente et al.

Page 1 of 1

It is certified that error appears in the above-identified patent and that said Letters Patent is hereby corrected as shown below:

In the Specification

In Column 3, Line 31, delete "delegates," and insert -- delegatee, --, therefor.

In Column 11, Line 49, delete "810" and insert -- s10 --, therefor.

In Column 12, Line 53, delete "delegates" and insert -- delegatee --, therefor.

In Column 12, Line 66, delete "delegates" and insert -- delegatee --, therefor.

In Column 13, Line 35, delete "delegates" and insert -- delegatee --, therefor.

In Column 13, Line 37, delete "delegates" and insert -- delegatee --, therefor.

In Column 17, Line 20, delete "controller 100," and insert -- controller 300, --, therefor.

In Column 17, Line 31, delete "controller 100" and insert -- controller 300 --, therefor.

In Column 19, Line 41, delete "delegates" and insert -- delegatee --, therefor.

In the Claims

In Column 24, Line 17, in Claim 14, delete "servicer" and insert -- service --, therefor.

Signed and Sealed this  
Twenty-first Day of April, 2015

Michelle K. Lee  
*Director of the United States Patent and Trademark Office*